United States Patent [19]

Sternberg et al.

[11] Patent Number: 4,642,570

[45] Date of Patent: Feb. 10, 1987

[54] METHOD AND APPARATUS FOR COMPLEX RESISTIVITY MEASUREMENTS WITH ELIMINATION OF ELECTROMAGNETIC COUPLING EFFECTS

[75] Inventors: Ben K. Sternberg, Ponca City, Okla.; Donald E. Dunster, Jakarta, Indonesia; Kenneth D. Honeycutt, Ponca City, Okla.

[73] Assignee: Conoco Inc., Ponca City, Okla.

[21] Appl. No.: 478,831

[22] Filed: Mar. 25, 1983

[51] Int. Cl.[4] .......................... G01V 3/24; G01V 3/38
[52] U.S. Cl. ...................................... 324/366; 324/362
[58] Field of Search .................. 340/861, 853–860; 324/323, 347, 366, 373, 362

[56] References Cited

U.S. PATENT DOCUMENTS

| | | | |
|---|---|---|---|
| 2,415,364 | 2/1947 | Mounce | 324/366 |
| 3,603,923 | 9/1971 | Nelligan | 340/861 |
| 3,902,113 | 8/1975 | Bridges et al. | |
| 4,278,942 | 7/1981 | Bonnet et al. | 324/366 |
| 4,295,096 | 10/1981 | Sternberg et al. | 324/357 |
| 4,359,687 | 11/1982 | Vinegar et al. | 324/366 |
| 4,389,645 | 6/1983 | Wharton | 340/854 |

FOREIGN PATENT DOCUMENTS 8101214 7/1981 France .

OTHER PUBLICATIONS

Interpretation of Buried Electrode Resistivity Data Using a Layered Earth Model, Geophysics, vol. 43, No. 9 (Aug. 1978), 988–1001.
Complex Formation Resistivity—The Forgotten Half of the Resistivity Log, D. D. Snyder, R. H. Merkel, J. T. Williams.
Induced Polarization Measurements In and Around Boreholes, D. D. Snyder and R. H. Merkel.
Borehole Logging Techniques Applied to Base Metal Ore Deposits, W. E. Glenn and P. H. Nelson.
"The Application of Geophysical Methods; Electrical Well Logging" V. N. Dakhnov, translated by G. V. Keller in vol. 57, No. 2, Quarterly of the Colorado School of Mines.
Nonlinear Complex Resistivity Logging, G. R. Olhoeft and J. H. Scott.

Primary Examiner—Ernest F. Karlsen
Assistant Examiner—Walter E. Snow
Attorney, Agent, or Firm—Charles E. Quarton

[57] ABSTRACT

An apparatus includes a logging tool having electrodes for introducing a current into a downhole formation and for detecting a voltage produced in the formation by the current. The current is provided by a transmitter circuit, and the voltage is received and processed by a receiver circuit including a computer programmed to provide induced polarization and resistivity measurements based on the detected voltage. The electrodes are equidistantly spaced but are adjustable (either on a single logging tool or as between different logging tools) so that various logging runs can be made to obtain different measurements whereby the intrinsic complex resistivity (induced polarization) of formation layers can be suitably resolved. The apparatus also includes a contact resistance measurement circuit for making measurements used by another computer means to determine the contact resistance of each of the electrodes. The contact resistance measurements are used to compute the coupling phase angles for correcting the data at the output of the initial computer means. The logging tool is constructed to reduce water, and therefore electrical, leakage.

3 Claims, 23 Drawing Figures

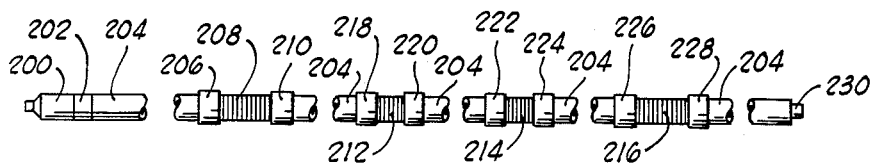
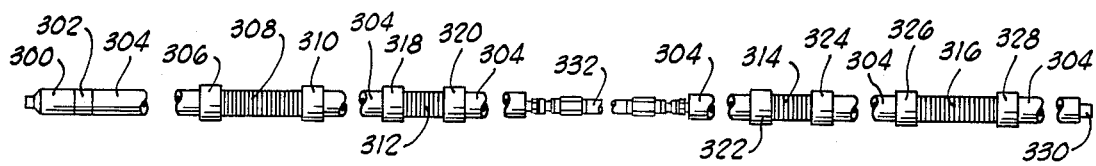
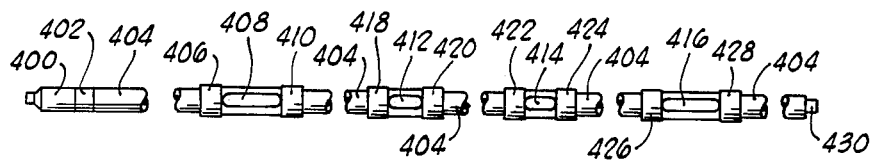
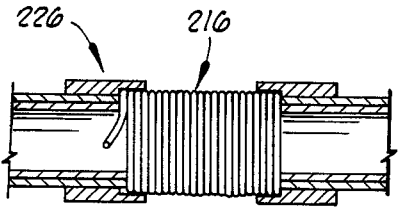
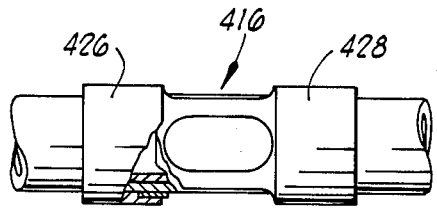

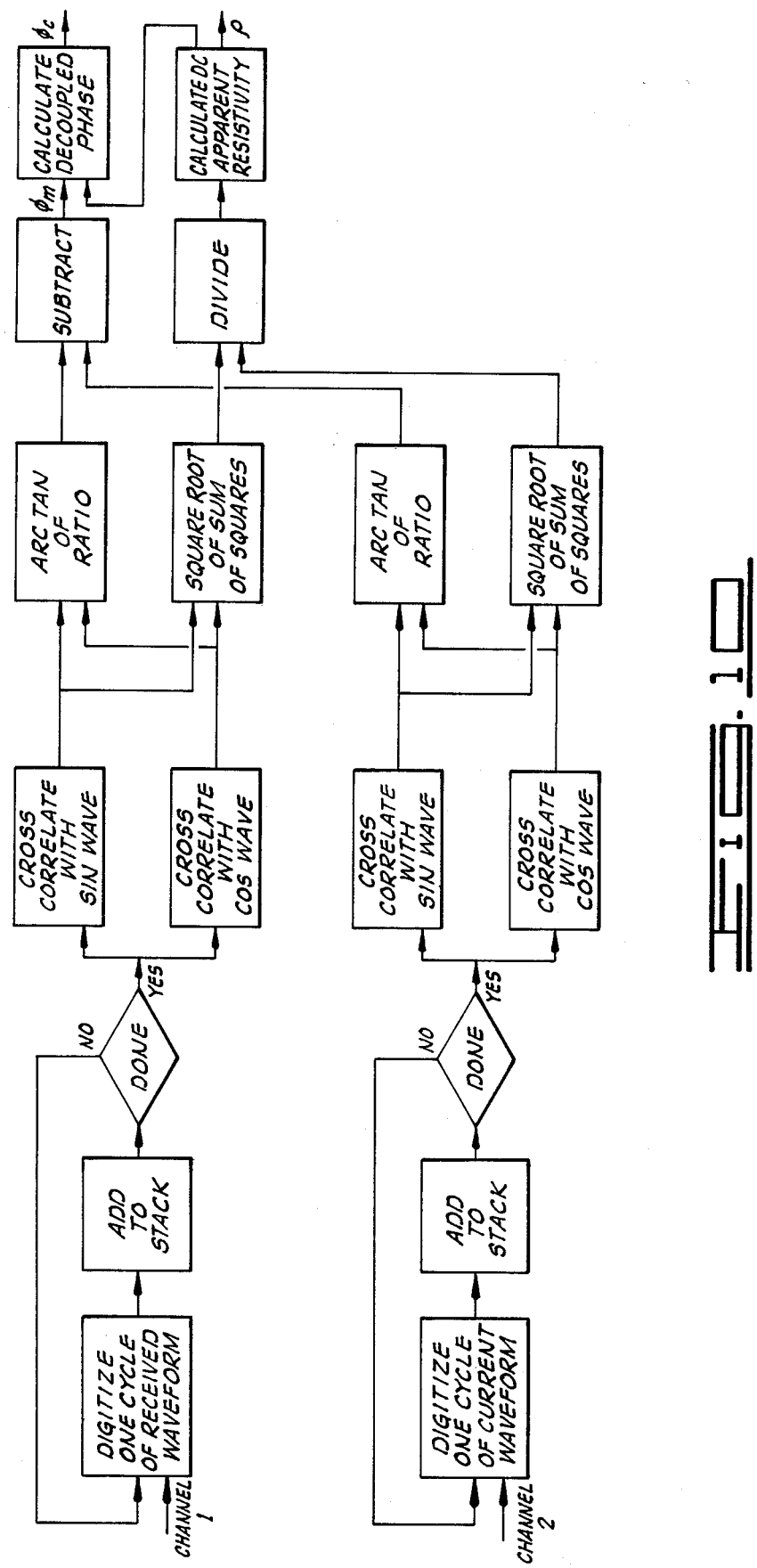

METHOD AND APPARATUS FOR COMPLEX RESISTIVITY MEASUREMENTS WITH ELIMINATION OF ELECTROMAGNETIC COUPLING EFFECTS

BACKGROUND OF THE INVENTION

This invention relates generally to apparatus and methods for making induced polarization and resistivity measurements in a borehole.

In the study of geological formations it is known that induced polarization and resistivity measurements can be made by means of surface-located equipment. See, for example, U.S. Pat. No. 4,295,056. Through the use of such surface equipment, induced polarization measurements which may include phase angle anomalies can be obtained. The phase angle anomalies can be created by a shallow subsurface polarizable material which is of significance to the oil and gas industry if its composition can be geochemically tested and found to contain hydrocarbons which have seeped from a deeper reservoir. However, before the material can be tested, its location must be pinpointed. Therefore, there is the need for an apparatus and a method which utilize electrodes in a borehole to make downhole induced polarization and resistivity measurements in the vicinity of the formations which are creating the anomalies so their locations can be accurately determined. Once located, the formations can be geochemically tested to determine if hydrocarbons are present (see, for example, U.S. Pat. No. 4,360,359). From such information one can tell whether hydrocarbons are seeping from a reservoir, for example. The need for an apparatus and a method for making such downhole measurements has been recognized. See, for example, *Complex Formation Resistivity—The Forgotten Half of the Resistivity Log* by D. D. Snyder, R. H. Merkel, and J. T. Williams and *Induced Polarization Measurements In and Around Boreholes* by D. D. Snyder and R. H. Merkel.

It has been observed that some of these anomalies arise from shallow or thin formations, thereby making it desirable to utilize an apparatus which can make measurements of sufficient resolution for such thin formations. This desirability indicates that a short array spacing of the electrodes be used, which short array spacing corresponds to the size of the thin layer; however, for such a short array spacing of the type needed to make the induced polarization and resistivity measurements, the measurements made thereby would be adversely affected by the electrical properties of the drilling mud or other fluid surrounding the electrodes at their measurement locations in the borehole. That is, a short array spacing would cause the apparatus to read the electrical properties of the drilling mud or other fluid rather than the electrical properties of the desired formation.

The borehole fluid can have a substantial effect on the phase readings made by such an apparatus because the borehole fluid may be a drilling mud typically containing highly polarizable montmorillonite clay, for example. Additionally, it is difficult, if not virtually impossible, to determine ahead of time exactly what the effect of the borehole fluid will be. Still further, a drilling mud tends to be electrochemically unstable so that it is difficult to determine at any given time what the electrical properties of the mud are. Furthermore, the depth of invasion of the mud or other borehole fluid into the rock formation is highly variable. Therefore, there is the need for the apparatus and method to be constructed and performed so that several suitable measurements with variable length arrays can be made and compared to derive a reasonable estimate of the electrical properties of thin formations. This reasonable estimate can be further refined by suitable modeling of the formation surrounding the borehole.

It is also desirable that the apparatus and method which meet the foregoing needs be usable with commercially available interconnection equipment presently found in the oil and gas industry. This commercially available equipment includes electrical logging cable comprising parallel electrical conductors. Such commercially available cable is susceptible to significant electromagnetic coupling between the various parallel conductors. This electromagnetic coupling adversely affects the induced polarization measurements.

One way to avoid the electromagnetic coupling is to use separately twisted pairs of wires; however, such twisted pairs of wires are not standard equipment in the oil and gas industry and thus their use would require special orders with possibly long lead times and high costs. Additionally, separately twisted wires would make for a thick cable which would reduce the amount of cable which could be retained on available winches.

Such a problem of electromagnetic coupling could also be overcome by placing certain equipment in the implement which is to be used in the borehole and telemetering the readings to the surface. A shortcoming of placing additional equipment in the borehole is that it requires packaging the equipment for use in the extreme pressures and temperatures found in the borehole. Furthermore, having the equipment downhole would limit the ability to control it, which ability would be present if the equipment were to be located at the surface. Telemetering signals to the surface would limit the dynamic range and accuracy of the measurements made in the borehole. Therefore, there is the need for the apparatus and method to be constructed and performed so that such adverse electromagnetic coupling is eliminated without preventing the apparatus and method from being used with or implemented by commercially available equipment.

It is known that such induced polarization and resistivity measurements as are referred to hereinabove are made by introducing a current into the formation and then detecting a voltage produced in the formation by the current. It has been discovered that it is important to control the density of the current because if the current density is too large, the induced polarization response will be non-linear with respect to the current and thus will not be representative of the response that a surface induced polarization survey would obtain. Therefore, the apparatus and method which meet the aforementioned needs should also meet the needs of maintaining an accurately controlled current output and utilizing a low-noise receiver which can accommodate very small transmitted currents.

To insure that accurate measurements are made, the apparatus should be constructed so that electrical leakage in the portion of the apparatus which is to be used in the borehole is reduced. It has been found that the phase measurement which is indicative of the induced polarization response is much more sensitive to minor amounts of electrical leakage than are conventional magnitude-only resistivity measurements. To prevent such electrical leakage, there is the need for the apparatus to be constructed so that there is substantially a zero pressure differential between the interior of the downhole implement and the borehole pressure to thereby preclude the flow of borehole fluid into the downhole implement.

To further insure the accuracy, the desired method is to be performed discretely whereby discrete, rather than continuous, measurements of the induced polarization and resistivity are made. Discrete measurements preclude the introduction of noise and instability which can occur by means of the movement of the downhole implement through the borehole fluid as measurements are taken. Additionally, the preferred current used to obtain such induced polarization and resistivity measurements is at a very low frequency so that if a continuous logging run were made, it could cover a substantial distance before one cycle of the current were transmitted.

More generally, there is the need for an apparatus and a method for obtaining measurements which can be used not only to qualitatively look for anomalies, but also to quantitatively understand surface-obtained induced polarization data, other surface geological and geophysical data and downhole electrical properties.

SUMMARY OF THE INVENTION

The present invention overcomes the above-noted and other shortcomings of the prior art and meets the aforementioned needs by providing a novel and improved apparatus and a novel and improved method for making induced polarization measurements. The apparatus and method permit the making of induced polarization, as well as formation resistivity, measurements in a borehole disposed through one or more formations which are to be investigated via such measurements. The apparatus and method of the present invention can be utilized to take several readings so that thin formation layers can be inspected. Furthermore, the present apparatus and method are capable of determining contact resistances which enable the apparatus and method to eliminate electromagnetic coupling. Current output is accurately controlled and low currents combined with a low-noise receiver are used to prevent non-linear responses of the induced polarization relative to the current. Electrical leakage is reduced by incorporating in the apparatus a means by which the pressure of a fluid contained within a portion of the apparatus is equalized with the pressure of the borehole fluid. The method of the present invention is preferably performed discretely to preclude the introduction of noise and instability and to permit the use of low frequencies.

Broadly, the apparatus of the present invention comprises transmitter means for providing an electrical current, a logging tool including both a current passing means for passing electrical current through a formation into which the logging tool can be lowered and a voltage detecting means for detecting a voltage produced in the formation by the electrical current. The apparatus also includes receiver means, responsive to the voltage detected by the voltage detecting means, for determining the induced polarization measurements. The apparatus further comprises means for measuring the contact resistances of the current passing means and voltage detecting means.

The current passing means and voltage detecting means both include a respective pair of electrodes. The electrodes are preferably linearly spaced with equal distances between each two adjacent electrodes. The electrodes are retained on a housing having associated therewith reservoir means for retaining a fluid in the housing and for responding to pressure in the borehole into which the logging tool may be lowered so that the pressure in the borehole and the pressure of the fluid in the housing are substantially equal.

When used to determine the induced polarization of a thin layer, the method of the present invention comprises the steps of lowering a logging tool into the borehole, which logging tool has electrodes which are each equidistantly spaced a first distance from adjacent ones of the electrodes. The method also includes conducting a first current between a first pair of the electrodes and into the formation in which the borehole is disposed, detecting with a second pair of electrodes a first voltage produced in the formation by the first current, and determining a first phase response from the first detected voltage. The method further includes the steps of changing the equidistant spacing between adjacent ones of the electrodes to a second distance which is different from the first distance, conducting a second current between the first set of electrodes and through the formation, detecting with the second set of electrodes a second voltage produced in the formation by the second current, determining a second phase response from the second detected voltage, and comparing the first phase response with the second phase response. The step of comparing the first phase response with the second phase response includes determining the induced polarization response of the formation to be an asymptotic value which the first and second phase responses approach as the second distance of spacing between adjacent ones of the electrodes increases.

From the foregoing it is a general object of the present invention to provide a novel and improved apparatus and method for making induced polarization measurements in a borehole. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 5A is a side view of a first logging tool of the apparatus shown in FIG. 1, the first logging tool having a first array spacing.

FIG. 5B is a side view of a second logging tool of the apparatus shown in FIG. 1, the second logging tool having a second array spacing.

FIG. 5C is a side view of a third logging tool of the apparatus shown in FIG. 1.

FIG. 5D is an enlarged, partial sectional view of a part of the tool shown in FIG. 5A.

FIG. 5E is an enlarged, partial sectional view of a part of the tool shown in FIG. 5C.

FIG. 10 is a flow chart of the data processing which occurs in the receiver means of the apparatus shown in FIG. 1.

DETAILED DESCRIPTION OF THE PREFERRED EMBODIMENT

With reference to the drawings, the preferred embodiment of the present invention will be described. The preferred embodiment apparatus of the present invention is shown in the functional block diagram of FIG. 1. The apparatus includes a transmitter means 2 for providing an electrical current to a logging tool 4 which is to be disposed in a borehole whereby induced polarization and resistivity measurements can be made at the locus of the borehole at which the logging tool 4 is positioned. The logging tool 4 detects a voltage produced in the formation in which the borehole is disposed and provides this detected voltage to a receiver means 6 forming another part of the inventive apparatus. The receiver means 6 determines the induced polarization and resistivity measurements.

The apparatus also includes a contact resistance measuring means 8 for measuring the contact resistance of electrodes associated with the logging tool 4. The contact resistance measured by the means 8 is used for determining electromagnetic coupling in the apparatus as will be further described hereinbelow.

Figure 1:
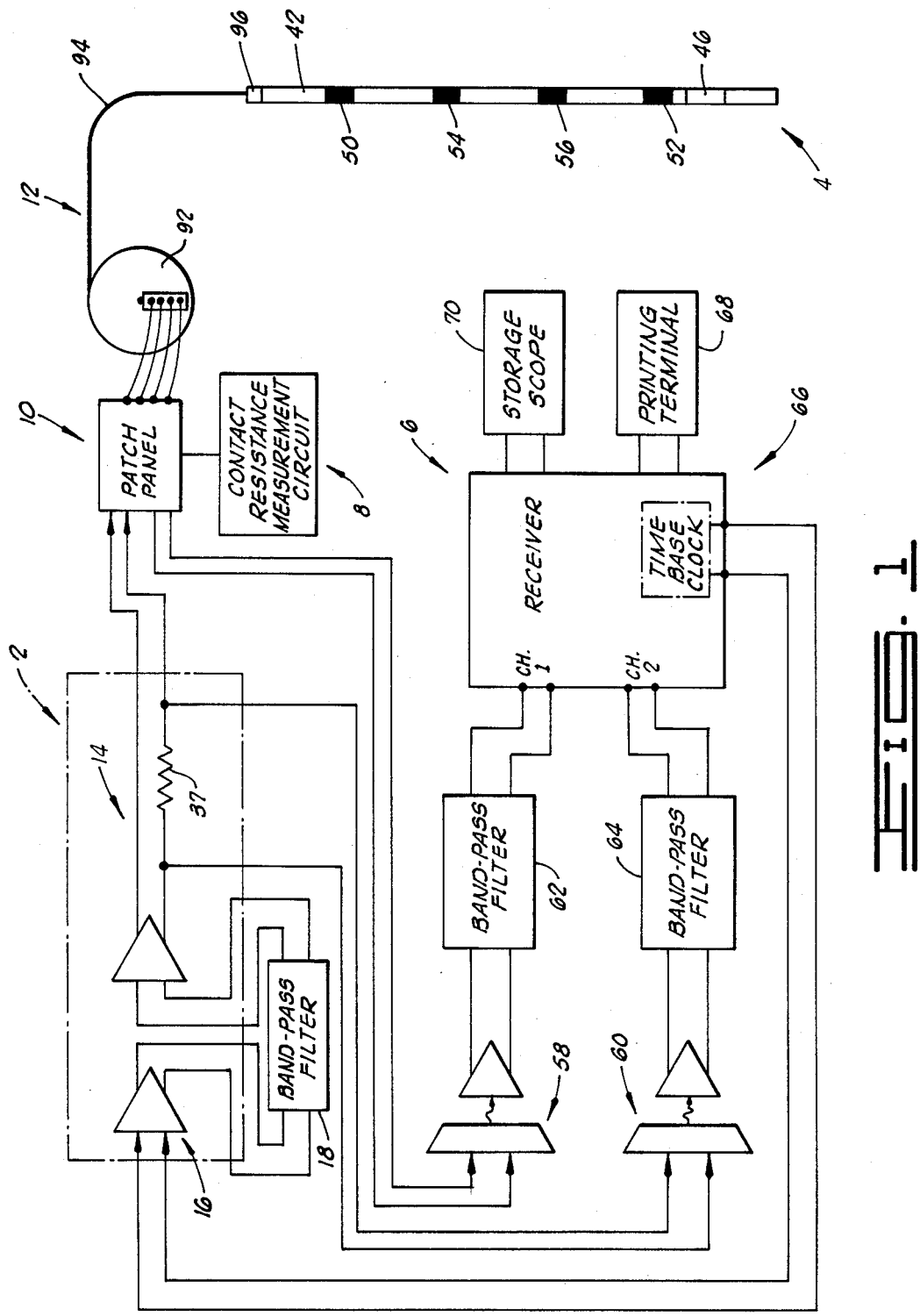
FIG. 1 is a functional block diagram of an apparatus constructed in accordance with the preferred embodiment of the present invention.

The logging tool 4 is electrically coupled with the transmitter means 2 and receiver means 8 by coupling means including a patch panel 10 and associated electrical cabling illustrated in FIG. 1. A portion of the cabling is shown mounted on a winch 12 forming part of a moving means for moving the logging tool 4 into and out of the borehole.

The borehole into which the logging tool 4 is lowered is not illustrated in the drawing; however, it is a typical borehole of the type made when drilling an oil or gas well, for example. In such a borehole there is often found a fluid such as drilling mud as known to the art. For the proper operation of the apparatus of the present invention, the fluid in the borehole must be of a type which is suitable for logging with an electrical logging tool. That is, the preferred embodiment of the present invention is not for use in a borehole which contains only air or which contains a non-conductive oil-based drilling mud which does not allow the current from the electrodes of the logging tool 4 to flow into the rock formations into which the borehole is drilled. One type of mud in which the apparatus can be used is that which typically contains highly polarizable montmorillonite clay; however, it should be noted that such mud can have a substantial effect on the phase readings made by the apparatus as further described hereinbelow. It is also virtually impossible to determine ahead of time exactly what the mud effect will be on the operation of the apparatus because the mud tends to be electrochemically unstable. Furthermore, the depth of the invasion of the mud into the rock formation is highly variable. Therefore, even when a suitable electrically conductive mud is used, the operation of the apparatus should be controlled as described hereinbelow.

In the preferred embodiment the transmitter means 2 provides a source of constant current. FIG. 1 illustrates that the transmitter means 2 includes a current generating means 14 for generating the electrical current. The electrical current is generated in the preferred embodiment as a constant peak amplitude, low-frequency, time-varying signal. Preferably, the signal is a sinusoidal waveform having a low amplitude to avoid a non-linear relationship between the current and the induced polarization measurements. In a specific embodiment the frequency is approximately 0.1 hertz and the amplitude is of the order of milliamperes.

The current generating means 14 is driven by a synchronizing timing signal provided by the receiver means 6. The timing signal is received by the transmitter means 2 via an isolator and buffer means 16. The isolator and buffer means 16 has an input and an output which are isolated from each as known to the art.

Figure 2:
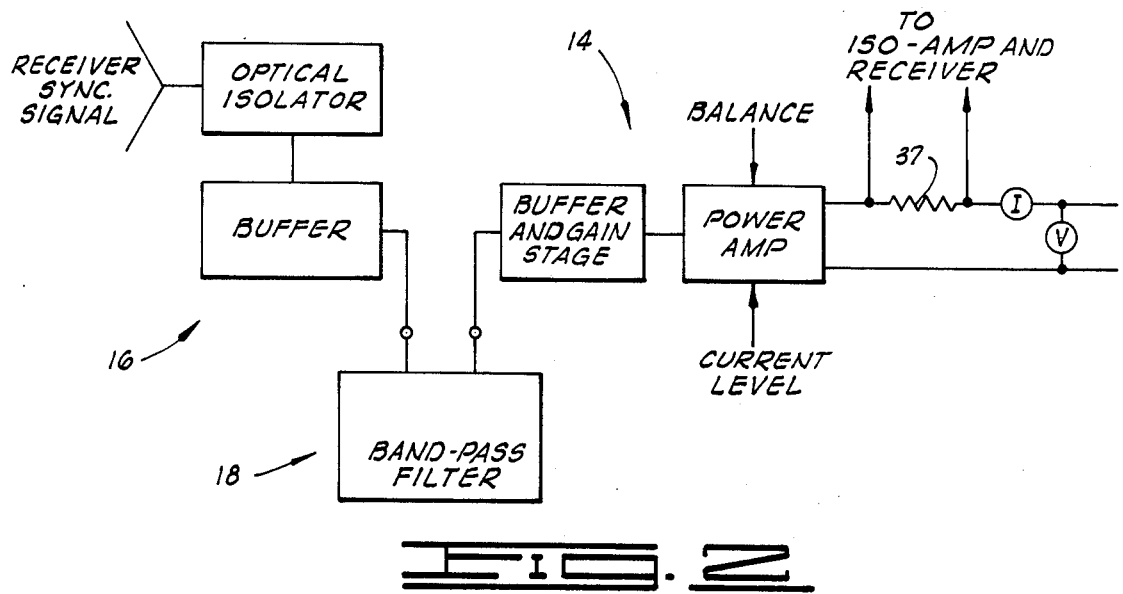
FIG. 2 is a functional block diagram of a transmitter means of the apparatus shown in FIG. 1.

As shown in FIGS. 1 and 2, the isolator and buffer means 16 is coupled to the current generating means 14 by a filter means 18. The filter means 18 converts the timing signal received by the isolator and buffer means 16 (which timing signal in the preferred embodiment is a square wave) into a sine wave having the desired frequency to be transmitted by the transmitter means 2. In the preferred embodiment the filter means 18 is an ITHACO Model 4211 filter.

The current generating means 14 along with the isolator and buffer means 16 are more specifically identified in the functional block diagram of FIG. 2. The specific preferred embodiment construction of these elements is illustrated by the front panel shown in FIG. 3 and the schematic circuit diagram of FIG. 4.

Figure 3:
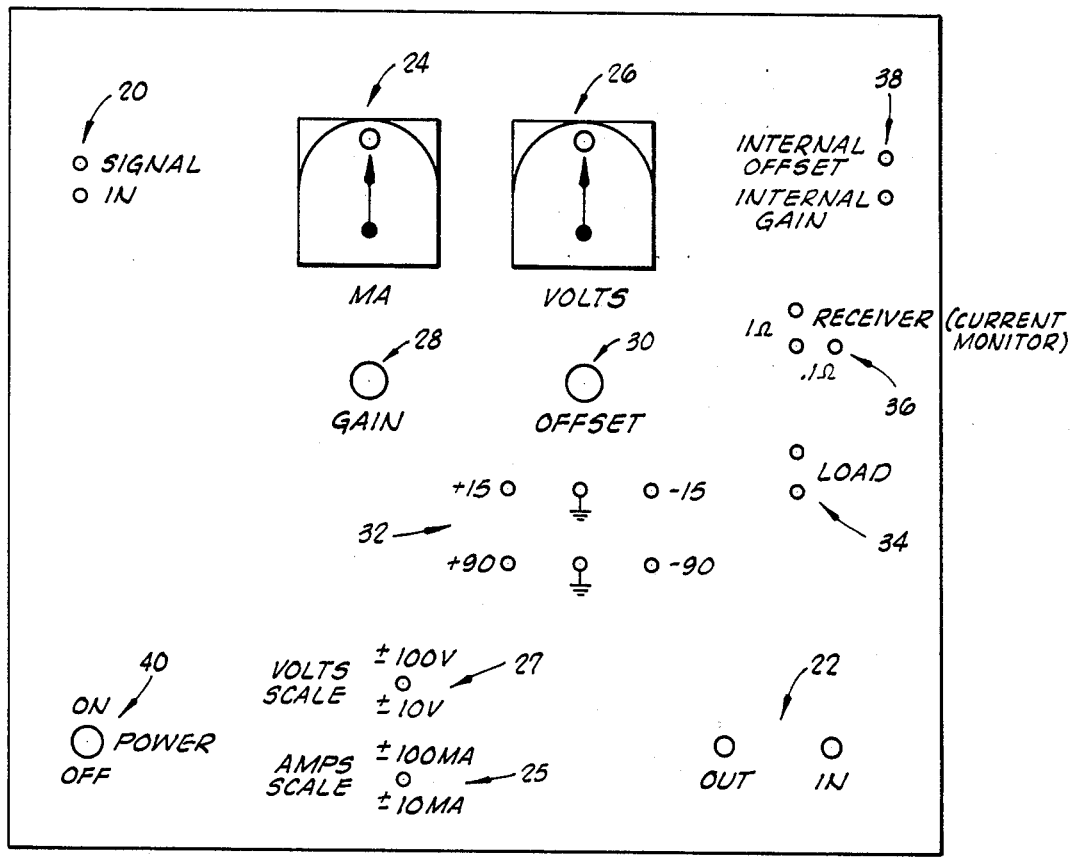
FIG. 3 is a schematic illustration of a control panel of the transmitter means.

With reference to FIG. 3, the front panel of the transmitter means 2 will be described. The timing signal from the receiver means 6 is received at "SIGNAL-IN" plugs 20. The filter means 18 is connected to "OUT" and "IN" coaxial cable connectors 22, the "OUT" connector being connected to the input of the filter means 18 and the "IN" connector being connected to the output of the filter means 18.

Also included on the panel of the transmitter means 2 are a current meter 24 and a voltage meter 26 of types known to the art. The meters 24 and 26 each have two full-scale ranges which are switchably selectable by means of switches 25 and 27. The current meter 24 indicates the amount of current which is being output by the transmitter means 2 as controlled by a gain potentiometer 28. To insure that there is no net DC output, an offset control potentiometer 30 is also provided.

Either dry cell batteries or a 12-volt DC/DC converter may be used to power the transmitter means 2. Tip jacks 32 are provided on the front panel to measure the battery or converter output voltage. Isolated DC/DC converters are used to power the transmitter means 2 and all other equipment associated with the preferred embodiment so that there is no common electrical path between the equipment via the power ground, thereby maintaining electrical isolation which is important for obtaining valid readings.

The front panel also includes two banana jacks 34 (labeled "LOAD") by means of which the transmitter means 2 is electrically connected with the logging tool 4.

The front panel further includes banana jacks 36 [marked "RECEIVER (CURRENT MONITOR)"] which are connected across precision shunt resistors in series with the load for use by the receiver means 6 in obtaining a current monitoring or detection signal. In normal operation of the preferred embodiment, the designated 1-ohm resistor is used. Such resistor is identified in FIG. 1 by the reference numeral 37.

Figure 4:
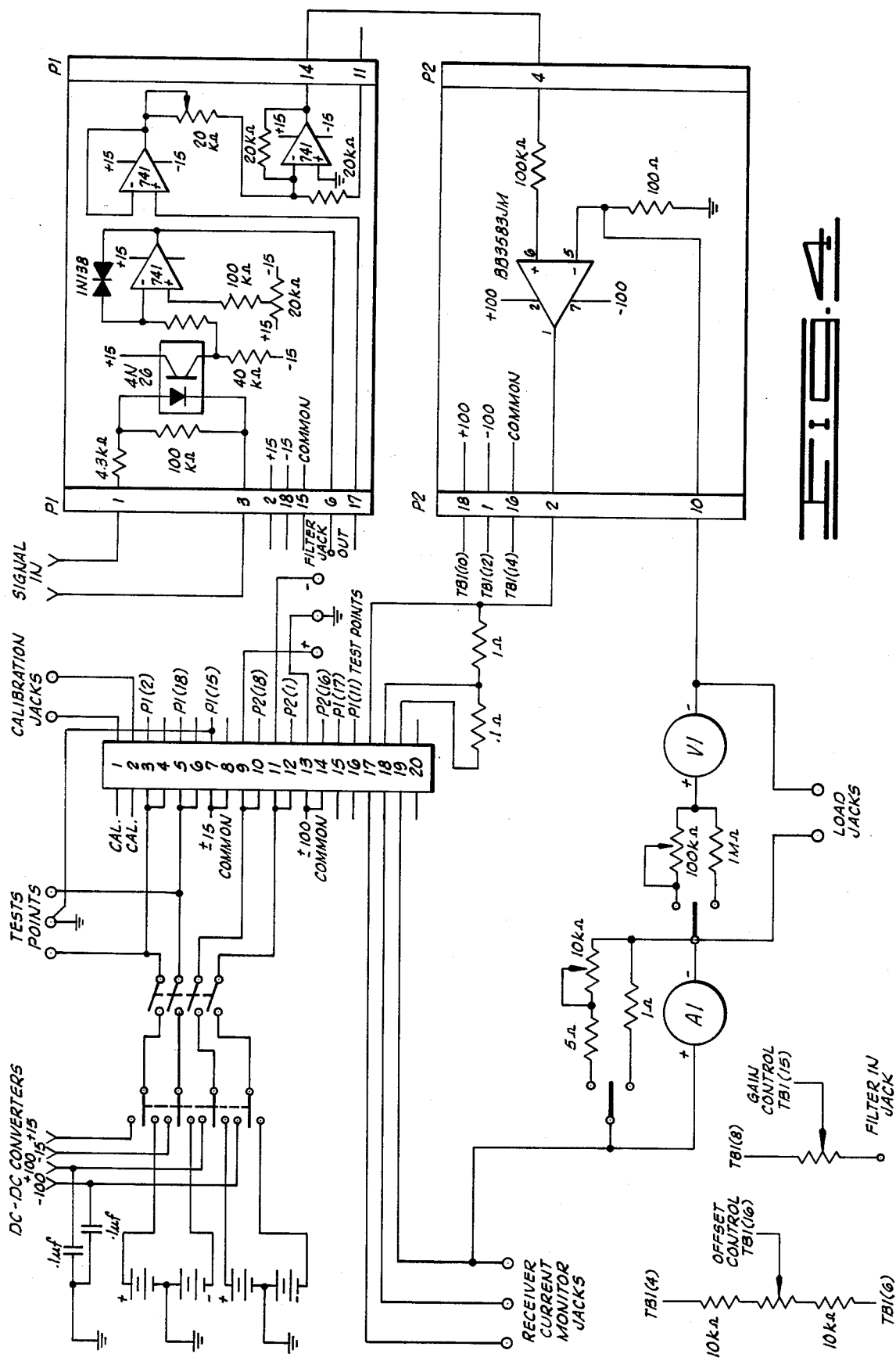
FIG. 4 is a schematic circuit diagram of the transmitter means.

The front panel also includes internal offset and gain potentiometer control means 38 for controlling the offset and gain of intermediate amplifiers before the final output of the power amplifier shown in the schematic circuit diagram of FIG. 4.

The transmitter means 2 is activated by means of the power switch 40 also located on the front panel shown in FIG. 3.

The schematic circuit diagram of FIG. 4 wherein the aforementioned elements of the current generating means 14 along with the isolator and buffer means 16 are specifically implemented is self-explanatory to those in the pertinent arts and thus will not be further described. However, it is to be noted that by means of the illustrated circuit, the transmitter means 2 can provide a constant-current sine wave of zero-to-±75 milliamperes and zero-to-±100 volts over a frequency range of between DC and several hundred hertz.

Figure 6A:
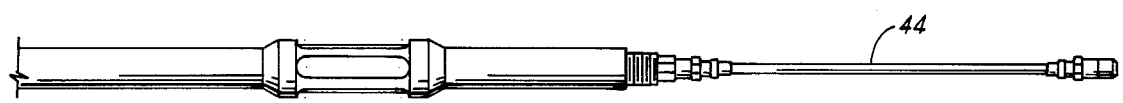
FIG. 6A is a side view of a portion of another type of logging tool of the apparatus shown in FIG. 1.
Figure 6B:
FIG. 6B is a side view of another portion of the logging tool shown in FIG. 6A.

The transmitted signal from the transmitter means 2 is provided via the coupling means to the logging tool 4 which is schematically shown in FIG. 1 and which is more particularly shown in part in FIGS. 5A, 5B, 6A and 6B. The logging tool 4 includes a support member 42 which extends substantially linearly in the preferred embodiment when the support member 42 is disposed in the borehole. The support member 42 has a passageway in which a fluid is contained. In the preferred embodiment the support member 42 is a housing made of a Fiberglas tube which is filled with oil to prevent or reduce electrical leakage between or among the various electrical components subsequently described. The fluid is retained in the support member 42 by suitable pressure responsive means for maintaining the fluid at a pressure which is substantially equal to the pressure of the borehole fluid to which the pressure responsive means responds. As shown in FIG. 6A, the pressure responsive means of the preferred embodiment is a reservoir means including a flexible, transparent bladder 44 disposed at the end of the support member 42. The bladder 44 is enclosed within a section 46 of the support member 42, which section 46 is threadedly connected to the portion of the support member 42 to which the bladder 44 is connected. A plurality of openings 47 is disposed along the section 46 for permitting communication of the borehole fluid with the bladder 44. The bladder 44 is used to equalize the pressure between the borehole fluid and the oil in the Fiberglas tube of the preferred embodiment of the logging tool 4 so that leakage of water into the tool, and therefore electrical leakage, is negligible.

The support member 42 also includes a section 48 which is a weighted end so that the tool will sink easily in the borehole. Extra weights may be screwed onto an end 49 of the section 48 if the mud weight is unusually high.

Associated with the support member 42 is a current passing means for passing the electrical current from the transmitter means 2 through the formation into which the borehole is drilled. In the preferred embodiment shown in FIG. 1, the current passing means includes a first electrode pair between which the electrical current is conducted in the borehole. The first electrode pair includes a first electrode 50 and a second electrode 52 which define terminals by which the current is introduced into the borehole and adjacent formation.

Also associated with the support member 42 is a voltage detecting means for detecting a voltage produced in the formation by the electrical current passing between the first and second electrodes 50, 52. The voltage detecting means includes a second electrode pair comprising a third electrode 54 and a fourth electrode 56 which define terminals by which the resulting voltage is detected.

In the preferred embodiment the electrodes 50–56 are linearly spaced along the length of the support member 42. The spaces between each set of adjacent electrodes is equal thereby resulting in the electrodes being spaced in a Wenner array. In the preferred embodiment the center spacing between the centers of adjacent electrodes is one-third meter, one meter, or three and one-third meters depending upon the size of the logging tool 4 desired. When the electrodes are spaced at three and one-third meter intervals, the support member 42 is constructed of two Fiberglas sections connected with a high pressure hose (see, e.g., element 332 in FIG. 5B).

The electrodes 50–56 of the preferred embodiment are made of either lead or platinum. FIGS. 5A and 5B illustrate the electrodes as lead electrodes, whereas FIG. 6A depicts one of the electrodes as a platinum electrode. It has been determined that lead electrodes are adequate for routine induced polarization measurements; however, the platinum electrodes are preferred for precise induced polarization measurements or for non-linear logging experiments. Platinum is preferred in these latter situations because platinum will polarize substantially less than lead. Such polarization distorts the detected data.

With more particular reference to FIG. 5A, there is shown a schematic illustration of a logging tool having an array spacing of one meter. The tool includes a geophysical head 200 and a connector 202. These elements are connected to a pipe 204 to which is also connected an electrode collar 206 by means of which a wire wound, lead electrode 208 is retained in association with the pipe 204. The electrode 208 is also retained in association with the pipe 204 by means of another electrode collar 210. Other wire wound, lead electrodes 212, 214 and 216 are retained in association with the pipe 204 by means of electrode collars 218–220, 222–224, and 226–228, respectively. The electrodes 208 and 216 have lengths of four inches between the facing edges of their respective electrode collars, whereas the electrodes 212 and 214 have lengths of two inches between the facing edges of their respective electrode collars. At the lower end of the pipe 204 is a bottom end insert 230 which mates with the section 48 illustrated in FIG. 6B.

As noted, the particular logging tool can have different array spacings as well as different types of electrodes. For example, a one-third meter tool can be constructed utilizing lead electrodes having lengths of two inches. A onemeter spacing tool having platinum electrodes with physical dimensions similar to those shown in FIG. 5A can also be constructed. FIG. 5B discloses a tool having an array spacing of three and one-third meters. This tool includes elements similar to those shown in FIG. 5A as indicated by like, reference numerals beginning with "3" rather than with "2." The tool of FIG. 5B also includes a high pressure hydraulic hose 332 suitably connected between two portions of the tool so that the tool can be folded into a package of manageable length. In the FIG. 5B tool, the current electrodes (i.e., electrodes 308 and 316) are six inches long and the potential electrodes (i.e., electrodes 312 and 314) are three inches long. In FIG. 5C there is shown a tool which also includes elements similar to those shown in FIG. 5A as indicated by the like reference numerals beginning with "4" rather than with "2;" however, the tool of FIG. 5C has platinum electrodes instead of lead electrodes. Details of the lead electrodes and platinum electrodes as used on the tools in FIGS. 5A–5C are shown in FIGS. 5D and 5E, respectively. Different dimensions, materials, and constructions of the logging tool are also within the scope of the present invention.

Referring again to FIG. 1, the voltage detected by the electrodes 54 and 56 is communicated to the receiver means 6. The receiver means 6 includes an isolator means 58 for receiving the detected voltage and for providing a signal corresponding to the detected voltage but isolated therefrom.

The receiver means 6 includes another isolator means 60 for receiving the current detection signal from the transmitter means 2 as provided across the resistor 37 shown in FIG. 1. The isolator means 60 receives the current detection signal and provides a signal corresponding to it but isolated therefrom.

The isolator means 58 and 60 effectively isolate the electrical circuits and signals of the transmitter means 2 from the circuits and signals of the receiver means 6 thereby avoiding contamination of the signals from the transmitter means with those of the receiver means. In the preferred embodiment each of the isolator means 58 and 60 includes a modified version of a standard isolation amplifier manufactured by Zonge Engineering and Research Organization of Tucson, Arizona. The modifications include having each isolation amplifier mounted in its separate box or housing isolated from each other, having each isolation amplifier provided with its own internal mercury batteries so that the isolation amplifiers do not obtain power from a common source, having each isolation amplifier low-pass filtered at either 33 or 909 hertz to avoid aliasing of high frequencies by the modulator in each isolation amplifier, and providing each with adjustable gains of X1, X10 and X100. Without these modifications, the original isolation amplifiers provided poor isolation characteristics for certain uses.

In the preferred embodiment, both of the isolation amplifiers are operated at the same gain and the same filter setting. The preferred filter setting is 909 hertz in normal use. The isolation amplifiers are also provided with tip jacks for measuring the battery voltage. A schematic circuit diagram of the isolator means 58 incorporating these features is shown in FIG. 7.

Figure 7:
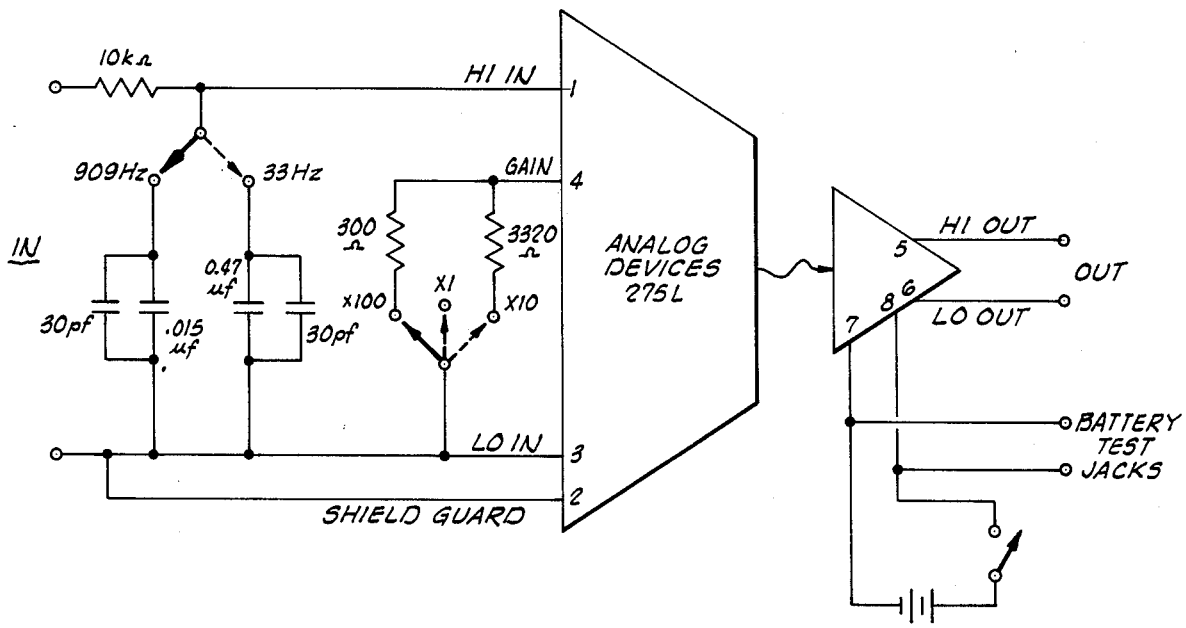
FIG. 7 is a schematic diagram of an isolator means of a receiver means of the apparatus shown in FIG. 1.

In the FIG. 7 embodiment, all resistors are one percent, metal film, ten ppm/°C. resistors. All lead lengths on the input circuit are kept as short as possible. The schematically depicted battery includes two Mallory TR136 8.4 V mercury batteries.

As shown in FIG. 1, the outputs from the isolation amplifiers 58 and 60 are provided to band-pass filters 62 and 64, respectively. The filters 62 and 64 are primarily for filtering very low frequency noise which occasionally occurs in the borehole. These filters are optional and are not usually used. When they are used, in the preferred embodiment they are Ithaco 4211 filters; however, other suitable filters may be used. The filters allow for bandpass filtering of the received signals. Occasionally, longperiod drifts of the self-potential in the borehole create severe low-frequency noise that cannot be averaged out. To remove this low-frequency noise, the filters are set to some convenient high-pass setting, such as 0.01 hertz for a 0.125 hertz signal. The low-pass setting is usually set at approximately 40 hertz. It is preferred that the filters not be used unless low-frequency noise makes it necessary because the filters introduce error into the measurements and further because they make the logging time much longer due to the required settling times of the filters. When the filters are used, the same filter responses and settings should be used and matched as closely as possible for each of the receiving channels (i.e., the channel receiving the signal from the logging tool 4 and the channel receiving the current monitoring or detection signal from the transmitter means 2).

The entire recording system including isolators 58 and 60, band-pass filters 62 and 64 (if used) and receiver means 6 must be calibrated to detect any mismatch or phase shift between the two channels. This is important because the phase values provided by the present invention are the phase-angle differences between the received waveform and the transmitted waveform at a particular frequency. Thus, when the receiver means calculates this phase difference, it is assumed that the filters in the receiver means have caused the same phase shift in both the transmitted and received waveforms. To insure that this is so, or to correct for it when there is a difference, the aforementioned system calibration is performed. This is made by disconnecting the input to the isolator means 58 from the voltage electrodes 54 and 56 and connecting it to the input of the isolator means 60. Because the input signals to both channels are thus the same, any phase difference on the output of the receiver means represents a mismatch of the two channels. In the preferred embodiment, if the mismatch is greater than 0.5 mrad, the mismatch should be subtracted from the phase difference data values.

Figure 8:
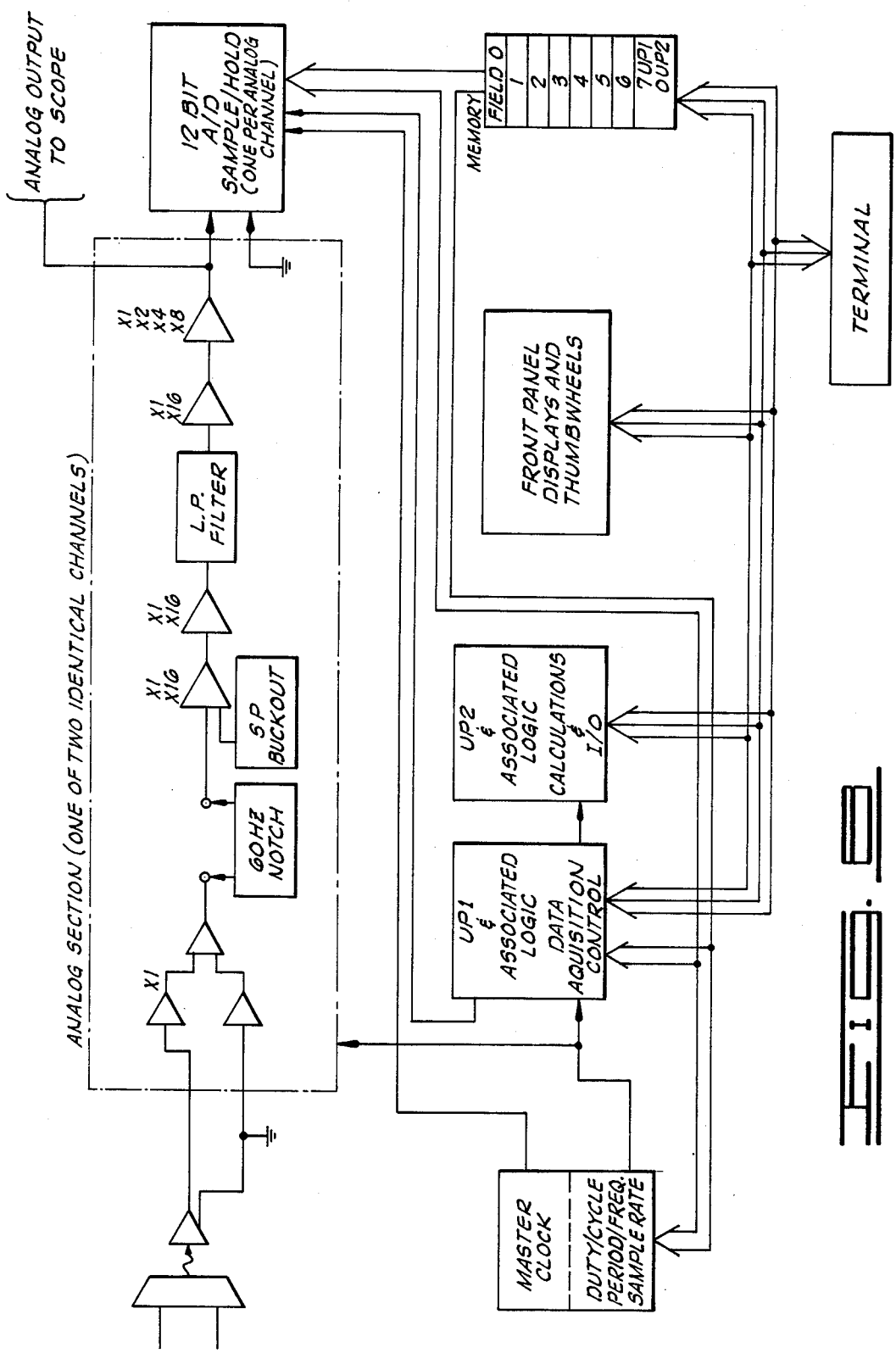
FIG. 8 is a functional block diagram of a portion of the receiver means of the apparatus shown in FIG. 1.

The outputs from the filters 62 and 64 (or from the isolator means 58 and 60 if the filters 62 and 64 are not used) are connected to a computer means 66 for computing the induced polarization and resistivity measurements. In the preferred embodiment the computer means 66 includes a GDP-12 receiver manufactured by Zonge Engineering and Research Organization. The GDP-12 receiver is a microprocessor-controlled data acquisition system having two channels of low-noise amplifiers and filters and 12-bit analog-to-digital converters. The GDP-12 receiver controls the data acquisition, averages (or "stacks") the received data signals, performs cross-correlation detection, and calculates the resistivity and phase angle measurements which are desired. A functional block diagram of the receiver is shown in FIG. 8. Included within the receiver is means for generating a timing signal which is the timing signal used by the transmitter means 2 as received thereby at the "SIGNAL-IN" connector 20 shown in FIG. 3. The GDP-12 receiver is used in its standard construction as known to the art except for a modification made at the inputs as illustrated in FIG. 9.

Figure 9:
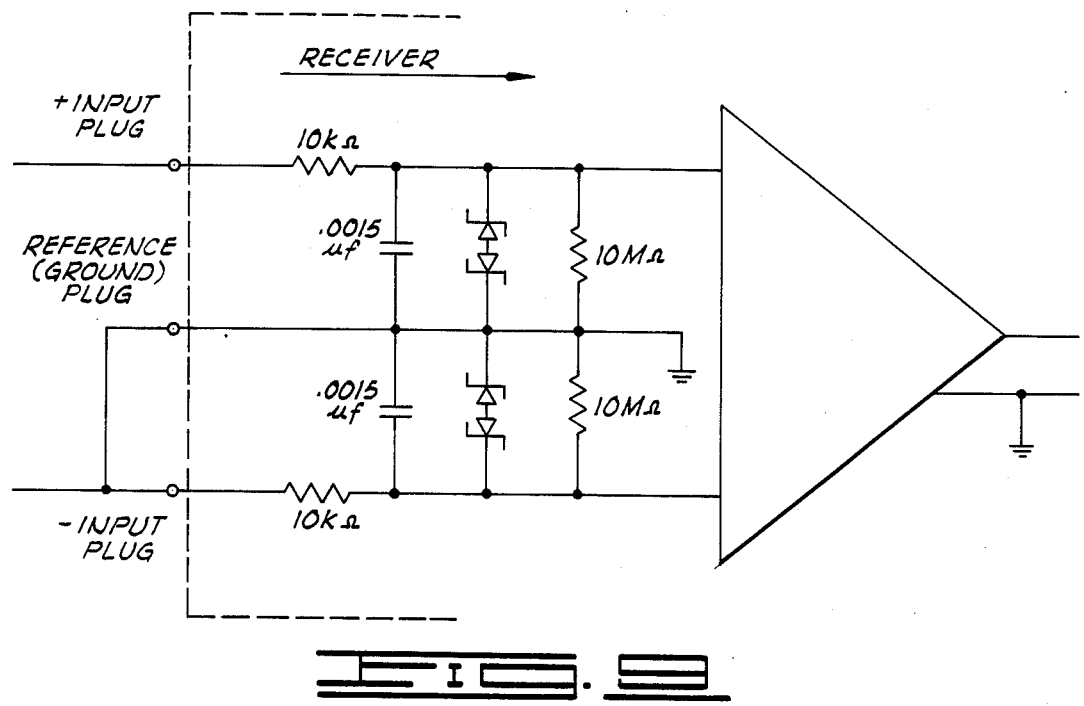
FIG. 9 is a schematic circuit diagram of a modification incorporated in the portion of the receiver means shown in FIG. 6.

In the FIG. 9 embodiment, the Zener diodes are 2N5133 having emitter-base junction breakdown voltages of nine volts. The low pass filtering is for RF suppression which is needed because of a slew rate limitation. The upper and lower legs of the filter must be precisely matched to avoid degrading common mode specifications. The breakpoint is set at approximately ten kilohertz. All resistors are one percent, metal film, ten ppm/°C. resistors.

The receiver is controlled by a computer program which in the preferred embodiment is a modified version of the standard resistivity-phase program for the GDP-12 receiver. The data acquisition part of the standard program is unmodified, but sections have been added to calculate the resistivities and phase angles and to print the results on a terminal 68. A flow chart of the program is shown in FIG. 10. Note that the phase angles that are referred to throughout this description are the measured phase angles ($\phi_m$) in FIG. 10. This is the phase angle difference between channel 1 (the received waveform) and channel 2 (the current waveform). The calculation of the decoupled phase angles ($\phi_c$) will be described in greater detail hereinafter. The resistivity ($\rho$) is determined as the ratio of the channel 1 to channel 2 magnitudes (i.e., $\rho = 4\pi a\, V/I$, where "a" is the spacing between adjacent electrodes of this array, "V" is the received voltage magnitude and "I" is the transmitted current magnitude). The geometric factor in the expression for the resistivity is $4\pi a$ rather than the more familiar $2\pi a$ because the electrodes are in a whole space rather than on a half space.

The printing terminal 68 prints the equipment parameters and the resistivity and phase angle measurements provided by the computer means 66. In addition to the printing terminal 68, the computer means 66 also has a storage scope 70 associated therewith. The storage scope 70 displays the monitored current signal and received analog signals. In the preferred embodiment the storage scope is a Tektronix Model 314 oscilloscope.

Figure 11:
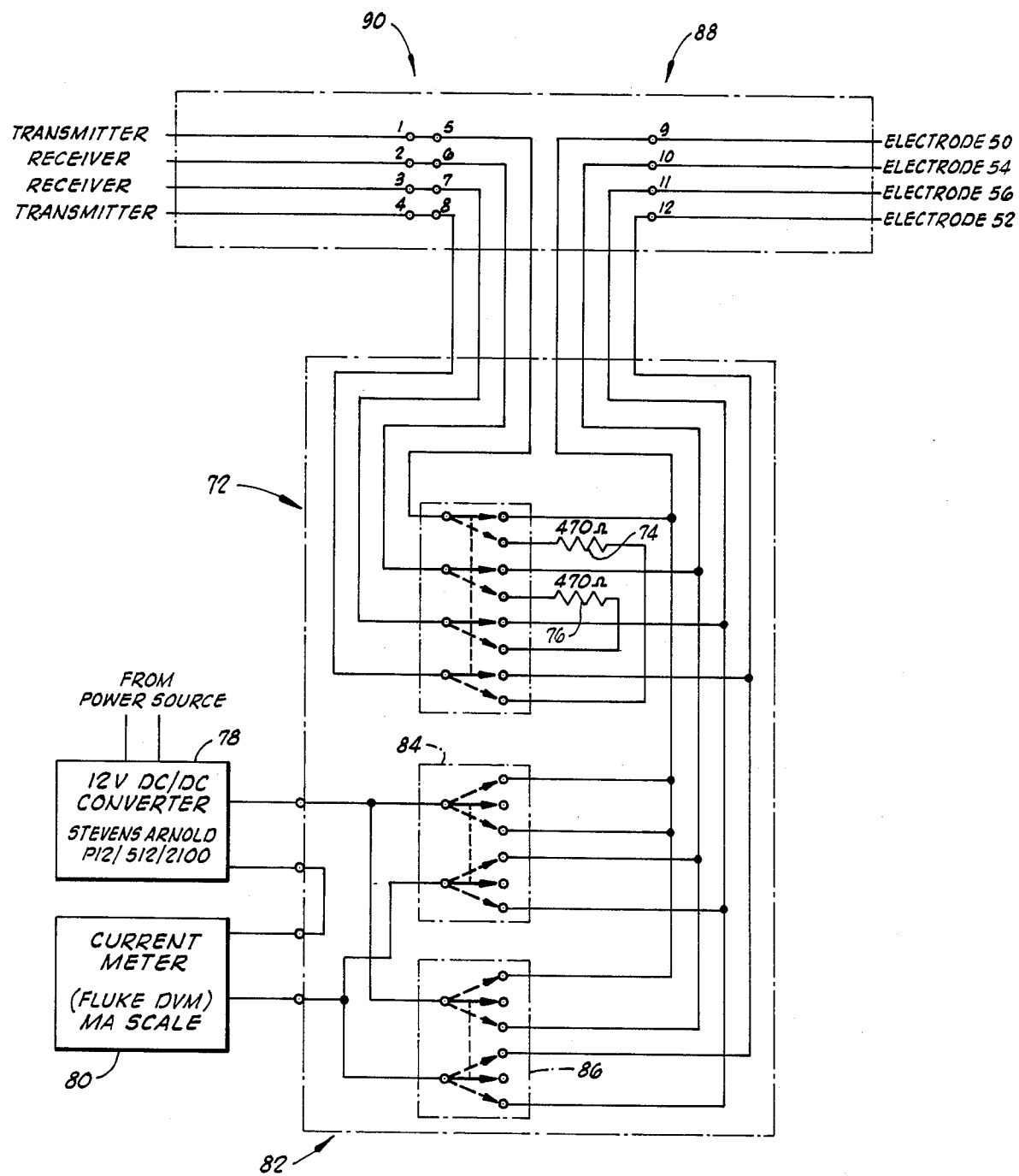
FIG. 11 is a schematic circuit diagram of a patch panel and a portion of a contact resistance measuring means of the apparatus shown in FIG. 1.

Referring to FIG. 11, the contact resistance measuring means 8 will be described. The contact resistance measuring means 8 includes a first switch means 72 for electrically connecting the transmitter means 2 and the receiver means 6 with the electrodes 50-56 when the first switch means is in a first position (illustrated in solid line in FIG. 11) and for electrically connecting the transmitter means 2 and the receiver means 6 to predetermined resistance means when the first switch means is in a second position (shown in dashed lines in FIG. 11). The resistance means includes, as shown in FIG. 11, a resistor 74 and a resistor 76.

The contact resistance measuring means 8 further includes a voltage source means 78 for providing a predetermined voltage. Associated with the voltage source means 78 is a current detecting means 80 for detecting the magnitude of a current flowing therethrough. The voltage source means 78 and the current detecting means 80 are of suitable types as known to the art. Suitable examples are designated in FIG. 11.

The contact resistance measuring means 8 further includes a second switch means 82. As shown in FIG. 11, the switch means 82 includes two switches 84 and 86 each having two ganged switch arms. When the switch 84 is in its "up" position as indicated in FIG. 11 by the upper dashed arrows thereof and the second switch 86 is in its normal or unactuated state indicated in FIG. 11 by the solid arrows thereof, the switch means 82 is said to be in a first position whereby the voltage source means 78 and the current detecting means 80 are electrically connected between the first electrode 50 and the third electrode 54 of the logging tool 4. When the switch 84 is in its "down" position as indicated by the lower dashed arrows in FIG. 11 and the switch 86 is in its unactuated state, the switch means 82 is said to be in a second position whereby the voltage source means 78 and the current detecting means 80 are electrically connected to the first electrode 50 and the fourth electrode 56. When the switch 84 is in its unactuated position as indicated by the solid arrows thereof in FIG. 11 and the switch 86 is in its "up" position indicated by the upper dashed arrows thereof in FIG. 11, the switch means 82 is said to be in a third position whereby the voltage source means 78 and the current detecting means 80 are electrically connected to the first electrode 50 and the second electrode 52. Lastly, when the switch 84 is in its unactuated position and the switch 86 is in its "down" position indicated by the lower dashed arrows in FIG. 11, the switch means 82 is in its fourth position whereby the voltage source means 78 and the current detecting means 80 are electrically connected to the third electrode 54 and the fourth electrode 56.

The use of the contact resistance measuring means 8 will be more particularly described hereinbelow with reference to the operation of the present invention.

The contact resistance measuring means 8 is associated with the patch panel 10 which is schematically illustrated in FIG. 11. The patch panel 10 includes first terminal means 88 associated with the winch 12 and second terminal means 90 associated with the transmitter means 2 and the receiver means 6. More particularly, the second terminal means is electrically connected with the current generating means 14 of the transmitter means 2 and with the isolator means 58 of the receiver means 6. In the preferred embodiment each of the first and second terminal means has four connectors connected to the respective elements identified in FIG. 11.

The connectors of the first terminal means 88 of the patch panel 10 are particularly connected in the preferred embodiment to a slip-ring 92 illustrated in FIG. 1 and forming a part of the winch 12 as known to the art. The winch 12 forms part of a commercially available logging truck having suitable winch control hydraulics, depth measurement means, and related controls as manufactured by Century Geophysical Corporation of Tulsa, Okla. Mounted on the winch 12 is a cable 94 including four electrical conductors, each of which is associated with a respective one of the electrodes 50-56 via a cable head 96. The conductors are also associated with respective ones of the connectors of the slip-ring 92. The cable 94 is a commercially available cable as known to the art, such as a 6,000 foot four-conductor 3/16-inch armored cable. Such a cable has the four conductors extending parallel to each other through the cable.

Each of the conductors of the cable 94 is suitably connected to the head of the support member 42 and to the slip-ring 92 for establishing electrical communication between the logging tool 4 and the patch panel 12. Because the electrical conductors in the logging cable are parallel, the transmitted signal passed over two of the conductors can couple by electromagnetic induction into the two conductors carrying the received signal from the voltage detecting electrodes, thereby distorting the received signal. To overcome this, the present invention provides for the determination of the cable parameters, the resistivity of the earth, and the electrode contact resistance for determining the electromagnetic coupling in the cable. Once the electromagnetic coupling is determined, it can be subtracted from the data output by the receiver means 6. The electrode contact resistances are determined by the contact resistance measuring means 8.

Figure 12:
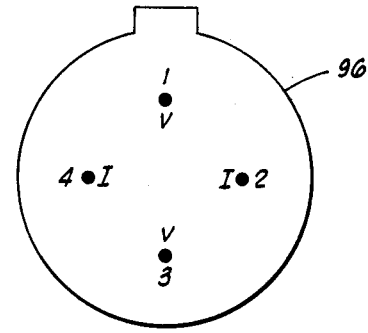
FIG. 12 is a schematic illustration of a cable head connector of a logging cable used for interconnecting the logging tool with the patch panel of the apparatus shown in FIG. 1.

To minimize the electromagnetic coupling, the four conductors of the cable 94 are connected to the cable head 96 in the manner illustrated in FIG. 12. The two conductors designated by the letters "V" indicate the two conductors running to the electrodes 54 and 56 which provide the terminals for detecting the voltage resulting in the formation from the current flow passing between the electrodes 50 and 52. The conductors designated by the letters "I" in FIG. 12 indicate the two conductors extending to the current electrodes 50 and 52. Although the conductors of the cable 94 can be connected in other configurations, such other connections have very large negative or very large positive electromagnetic coupling effects which makes it more difficult to accurately determine and, therefore, to remove the electromagnetic coupling.

Before utilizing the apparatus of the present invention, the logging tool should first be checked to insure that it is full of oil with no air pockets. If oil is to be added, it should be done so that air bubbles are avoided because air pockets in the oil may be compressed at large depths, allowing water to leak in, and subsequently causing electrical leakage in the tool. It is preferable to fill the logging tool well in advance of its use so that air bubbles in the oil will have time to escape. To assist in this, after the tool has been filled it should be elevated with the bladder end up. The tool should be maintained in this position until all signs of air bubbles have disappeared as visually determined by checking the transparent bladder 44.

Because the bladder 44 has a finite volume, it should be noted that expansion of the oil contained therein could cause the bladder to burst if the oil gets too hot. Conversely, the bladder may be completely drained of oil if the oil gets too cold and sufficiently contracts. For example, the oil may expand or contract at a rate of about 0.04 percent per degree Fahrenheit. In either case of expansion or contraction, the tool could thereafter leak water thereby invalidating the data collected by the tool under such conditions. Therefore, if the tool is to be used in a relatively shallow (and thus relatively cool) borehole, the tool should not be placed in the hot sun for a relatively long period of time. Likewise, if the tool is to be used in a relatively deep borehole, it may be necessary to warm the tool before sealing the bladder if it is to be used when the air temperature at the surface is very cold.

An additional step to be taken before making a logging run with the logging tool of the present invention is to check the tool for leakage between the electrodes and between each electrode and the cable head. The tool must be clean and dry to make this check, which check can be made with a digital voltmeter (DVM). The DVM should be connected at the patch panel with the connections to the transmitter and receiver equipment removed. In the preferred embodiment, the resistance as measured by the DVM should be greater than twenty megaohms between all unterminated electrodes and between the electrodes and the cable ground. A short jumper cable should also be used at the tool to connect each electrode to each other electrode for a cable continuity check.

In operating the apparatus of the present invention, the logging tool 4 is lowered into the borehole by the winch 12 as known to the art. For example, when the logging tool 4 is used at a borehole where no drilling rig is present, a logging boom and a taller mast located on the aforementioned logging truck are used to lift the tool 4 above the borehole and to lower it into the borehole. When the logging tool 4 is used at a well at which a drilling rig is located, the tool can be lowered by means of the crown and traveling blocks which have a top sheave connected thereto. The logging cable is run through this top sheave and a bottom sheave chained or otherwise fastened to the rig floor. The cable is run through these two sheaves between the logging boom and the logging tool 4.

The depth to which the tool is lowered, or subsequently raised, is determined by suitable depth measuring means of a type known to the art. Preferably, the depth measuring means is zeroed when the center of the logging tool 4 is at the reference point, such as the top of the borehole. The center of the tool is preferably used for zero depth in the preferred embodiment which incorporates a symmetrical Wenner array of electrodes. For longer tools, the depth measuring means may be zeroed when the uppermost electrode is at the reference point because it may be impractical to raise the tool high enough to zero the depth measuring means when the center of the long tool is at the reference point when the reference point is the top of the borehole at ground level. Another suitable reference point may be where the Kelly Bushing is positioned on the rotary table of a drilling rig.

The logging tool 4 is preferably initially lowered into the borehole to the lowermost point of logging. Thereafter, the tool 4 is raised to subsequent points of measurement. This logging from bottom to top is preferred because when the tool is being lowered, the tool may not have settled to the correct depth before a measurement is completed. On the other hand, when the tool is being pulled up, it will always be at the correct depth when the winch is stopped and a measurement made. Another reason for logging while bringing the tool 4 up the borehole is that the depth counter in the logging truck may slip when the cable is being lowered; however, it would be unlikely to slip when the cable is being raised. If there is any mismatch between zero feet on the depth measuring means and the point at which the tool actually reaches the surface, this correction can safely be applied to all depths that were recorded as the tool was being raised.

Measurements in the borehole are taken at suitable intervals. For example, in shallow wells where a detailed log is desired, measurements may be made every two feet when either the one-third-meter or one-meter electrode-spaced tools are used and every four feet when the three and one-third-meter electrode-spaced tool is used.

At each point of measurement, the measurements derived by the computer means 66 in response to the voltage detected by the electrodes 54 and 56 are recorded on the printing terminal 68.

After a logging run has been conducted, it is desirable to repeat several of the measurements to verify the accuracy of the received data. In the preferred embodiment, for example, after the initial logging run is made, measurements at about five to ten depths should be repeated. The repeat readings should be within about ±1.0 milliradians of the first readings. If the measured data do not repeat within this range or if the readings look unusual in any other way, the tool should be pulled out of the hole and checked for leakage.

An important feature of the present invention is the use of the variable array spacings obtainable by means of a logging tool capable of having the electrodes adjustably retained thereon so that the spacings between adjacent electrodes can be varied from one logging run to another or by means of individual tools having differently spaced electrodes. This is important in obtaining a suitable resolution for thin formation layers and in avoiding spurious readings from the fluid in the borehole. In order to obtain the best possible resolution of thin layers, it would be desirable to use a very short tool. However, if the tool length is very small, the electrical properties of the fluid surrounding the tool in the borehole will be measured rather than the electrical properties of the formation. As previously discussed, the ambient fluid can have a substantial effect on the readings obtained by the electrodes 54 and 56. Because such very short tools are therefore undesirable, the present invention has been developed to permit measurements to be made with tools having different array spacings. If the phase response gradually changes but asymptotically approaches a constant value as the array spacing is increased, the asymptotic value is used as the intrinsic induced polarization response of the formation.

Although this asymptotic value can be used as a reasonable approximation of the induced polarization response, the resolution of the electrical properties of the thin formations will still not be well resolved. This shortcoming can be overcome by appropriately modeling the rock formation and calculating a theoretical response. A model which gives the best match between the theoretical response and the observed response gives the intrinsic resistivity and induced polarization response of the thin formation.

The model calculations that are needed for this step of the interpretation can be made by an application of the potential field equations and boundary conditions. The details of these calculations for an array downhole in a layered earth are given in Daniels, J. J., "Interpretation of Buried Electrode Resistivity Data Using a Layered Earth Model," Geophysics, Vol. 43, No. 5, August 1978, pp. 988–1001, and are not repeated here.

To obtain the observed response, a logging tool having a first set of two electrodes and a second set of two electrodes wherein each electrode is equidistantly spaced a first distance from each adjacent one of the electrodes is lowered into the borehole. A first current is conducted between the electrodes of the first set of electrodes and through the adjacent formation. The second set of electrodes detects a first voltage produced in the formation by the first current, and a first phase response and a first resistivity response from the first detected voltage are determined. Next, the equidistant spacing between adjacent ones of the electrodes is changed to a second distance which is different from the first distance. A second current is then conducted between the electrodes of the first set of electrodes and through the formation. The second set of electrodes then detects a second voltage produced in the formation by the second current and a second phase response and a second resistivity response are determined from the second detected voltage. The first phase and resistivity responses are compared with the second phase and resistivity responses and the asymptotic values determined. The equidistant spacing can be changed by simply using a second logging tool having its electrodes equidistantly spaced a second distance which is different from the spacing maintained on the initial logging tool.

Because the cable 94 which is used for interconnecting the logging tool 4 with the patch panel 12 includes parallel electrical conductors, electromagnetic coupling between the wires can cause the resultant phase reading to be in error. To overcome this problem, the cable coupling can be measured, corresponding to each measurement point, and subtracted from the recorded data. To keep the electromagnetic coupling within reasonable limits and to maintain accuracy in the decoupling procedure, the electrical conductors of the cable 94 are preferably connected in the order illustrated in FIG. 12.

The magnitude of the electromagnetic coupling depends upon the following parameters: the frequency, the electrode spacing, the cable length, the formation resistivity, and the contact resistance. The following table summarizes under what circumstances electromagnetic coupling will be most severe:

| High Electromagnetic Coupling | Low Electromagnetic Coupling |
|---|---|
| High Frequency | Low Frequency |
| Long Electrode Spacing | Short Electrode Spacing |
| Long Cable Length | Short Cable Length |
| Low Formation Resistivity | High Formation Resistivity |
| High Electrode Contact Resistance | Low Electrode Contact Resistance |

The frequency, electrode spacing and cable length are controlled by the operator and are therefore known. The formation resistivity is obtained as a normal output of the present invention. However, the contact resistance is not otherwise known and thus must be determined. It is to be noted that in shallow wells of less than 400 feet, for example, it is desirable to use the commercially available shorter logging cable having a length of the order of 600 feet rather than the longer logging cable of 6,000 feet because when the shorter cable is used, the electromagnetic coupling will usually be negligible at low frequencies thereby eliminating the need for making the contact resistance measurements and for computing the coupling phase angles. Furthermore, at higher frequencies the coupling phase angles will be smaller and can be more accurately computed and removed.

To determine the contact resistances of each of the electrodes 50–56, the contact resistance measurement means 8 and a computer programmed to operate the program listed at the end of this detailed description are used. The contact resistance is to be determined for every depth at which data are recorded. The contact resistance measurements should be made after completing each data run at a particular depth to avoid altering the electrochemistry of the borehole and to avoid upsetting the filters in the receiver means 6.

The procedure for using the contact resistance measurement circuit 8 includes switching the switch means 72 to its second position wherein the resistors 74 and 76 are connected as the loads to the transmitter means 2 and the receiver means 6, respectively. This loading of the transmitter means 2 and the receiver means 6 prevents the filters of the elements from drifting far off the equilibrium configurations. Next, the switch means 82 is moved through its aforementioned four positions. At each position of the switch means 82, the current detected by the current detecting means 80 is recorded for use by the computer program listed hereinbelow. These readings from the current detecting means 80 are used by the program to compute the particular contact resistance at each electrode. The program converts the resistances between the various pairs of electrodes determined from the current readings obtained by operating the switch means 82 into the individual contact resistance measurements. This conversion is by means of the following equation which is specifically written for the contact resistance of the electrode 50, designated $R_{50}$:

$$R_{50} = (R_{50,54} - R_{54,56} + R_{50,56})/2,$$

where $R_{50,54}$ is the resistance measured between the electrodes 50 and 54; $R_{54,56}$ is the resistance measured between the electrodes 54 and 56; and $R_{50,56}$ is the resistance measured between the electrodes 50 and 56.

The listed program is used within the preferred embodiment on a Texas Instruments TI-59 calculator.

Figure 13:
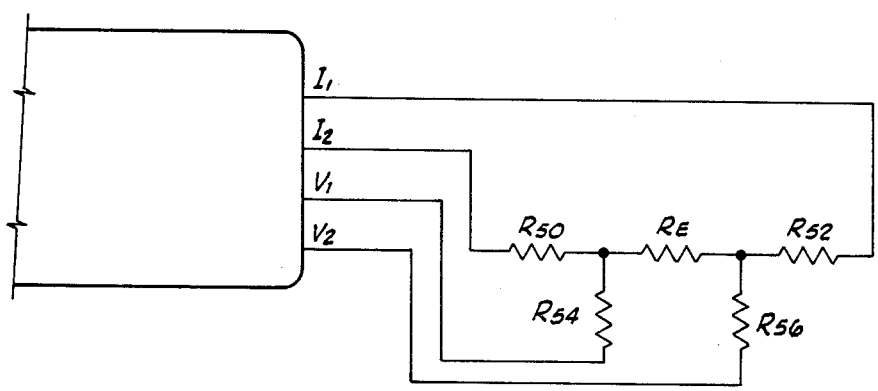
FIG. 13 is a schematic circuit diagram of a dummy load used to determine electromagnetic coupling in the apparatus shown in FIG. 1.

To determine the amount of electromagnetic coupling in the cable once the contact resistances have been determined, the resistivity and contact resistances are simulated by a dummy load including a resistor network placed at the end of the cable 94 as shown in FIG. 13. In FIG. 13, $R_{50}$, $R_{52}$, $R_{54}$, and $R_{56}$ represent the contact resistance of the respective electrodes. These values are typically between 3 and 300 ohms. $R_E$ is the equivalent resistance of the earth as determined by the measured formation resistivity (i.e., $R_E = \rho/4\pi a$, where "$\rho$" is the formation resistivity and "a" is the distance between adjacent pairs of electrodes). The typical range for $R_E$ for the array spacings referred to hereinabove is 0.08 to 250 ohms. In the preferred embodiment the dummy load contact resistances for $R_{50}$, $R_{52}$, $R_{54}$, and $R_{56}$ are simulated with Ohmite 3420 substitution boxes and the dummy load equivalent resistance of the earth for $R_E$ is simulated with the General Radio 1433-F substitution box.

The dummy load is run in the same manner as a regular logging measurement to obtain phase readings. The obtained phase reading minus any channel-to-channel phase mismatch is the amount of electromagnetic coupling. This value must then be subtracted from the downhole data obtained during a normal logging run.

Because electromagnetic coupling normally affects only the measured phase response and not the measured resistivity to a significant extent, the magnitude of $R_E$ should be set equal to the resistivity as measured by the receiver means 6 when a dummy load is run. Because the dummy load is a purely resistive network, it should have a zero phase delay associated with it and a magnitude response given by the value of $R_E$; therefore, any phase given at the output of the receiver means 6 (after correction for channel-to-channel phase mismatch) during a dummy load run must be the electromagnetic coupling.

Note that the same cable must be used for the dummy load test as was used for the data run. The electromagnetic coupling (dummy load) tests should be made as soon as possible after a normal logging run has been made because the system response and the cable 94 inductance, capacitance and resistance can all change with time and environmental conditions. Changes in these conditions can have a substantial effect on the electromagnetic coupling.

Figure 14:
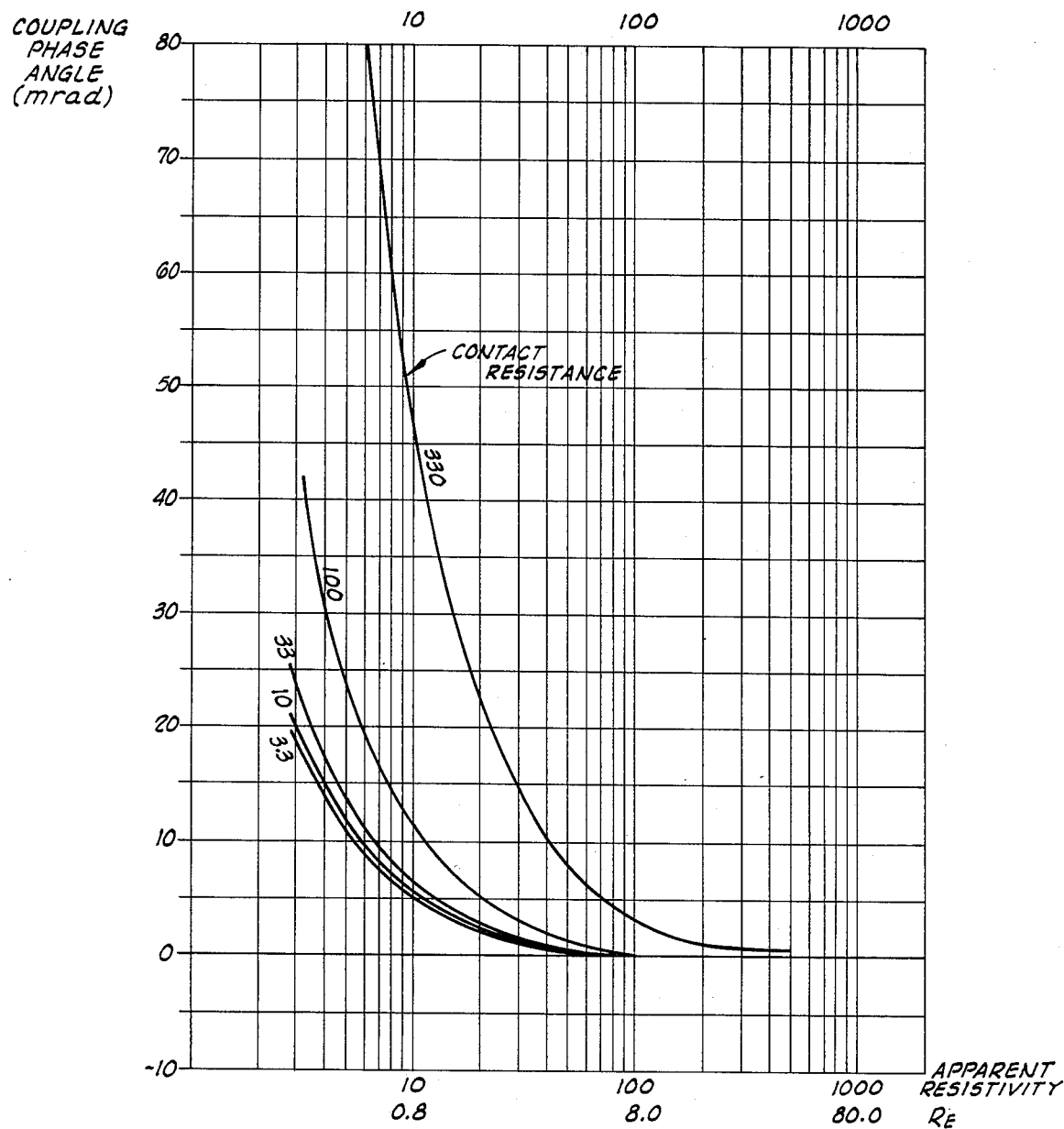
FIG. 14 shows plots of coupling phase angles for various contact resistances as determined by the present invention.

Examples of electromagnetic coupling phase angles as determined from the dummy load test are illustrated in FIG. 14. The illustrated plots are for a 6,000-foot cable, an array spacing of 1.0 meter, and a frequency of 1.0 hertz. The various curves are for contact resistances of 3.3 ohms, 10 ohms, 33 ohms, 100 ohms, and 330 ohms as indicated.

The dummy load test can also be used in checking for electrical leakage. The dummy load test as previously described is first run. After this test has been completed, the potential leads ($V_1$ and $V_2$ in FIG. 13) at the dummy load are disconnected and shorted together. There should be no change in the current monitor signal both in magnitude and phase. The potential signal magnitude should be zero (except for any electromagnetic coupling), and the phase of the potential signal will be meaningless. Next, the current monitor signal is disconnected and the potential signal is reconnected. There should not be any difference in the potential signal when compared with the normal dummy load run.

Figure 15:
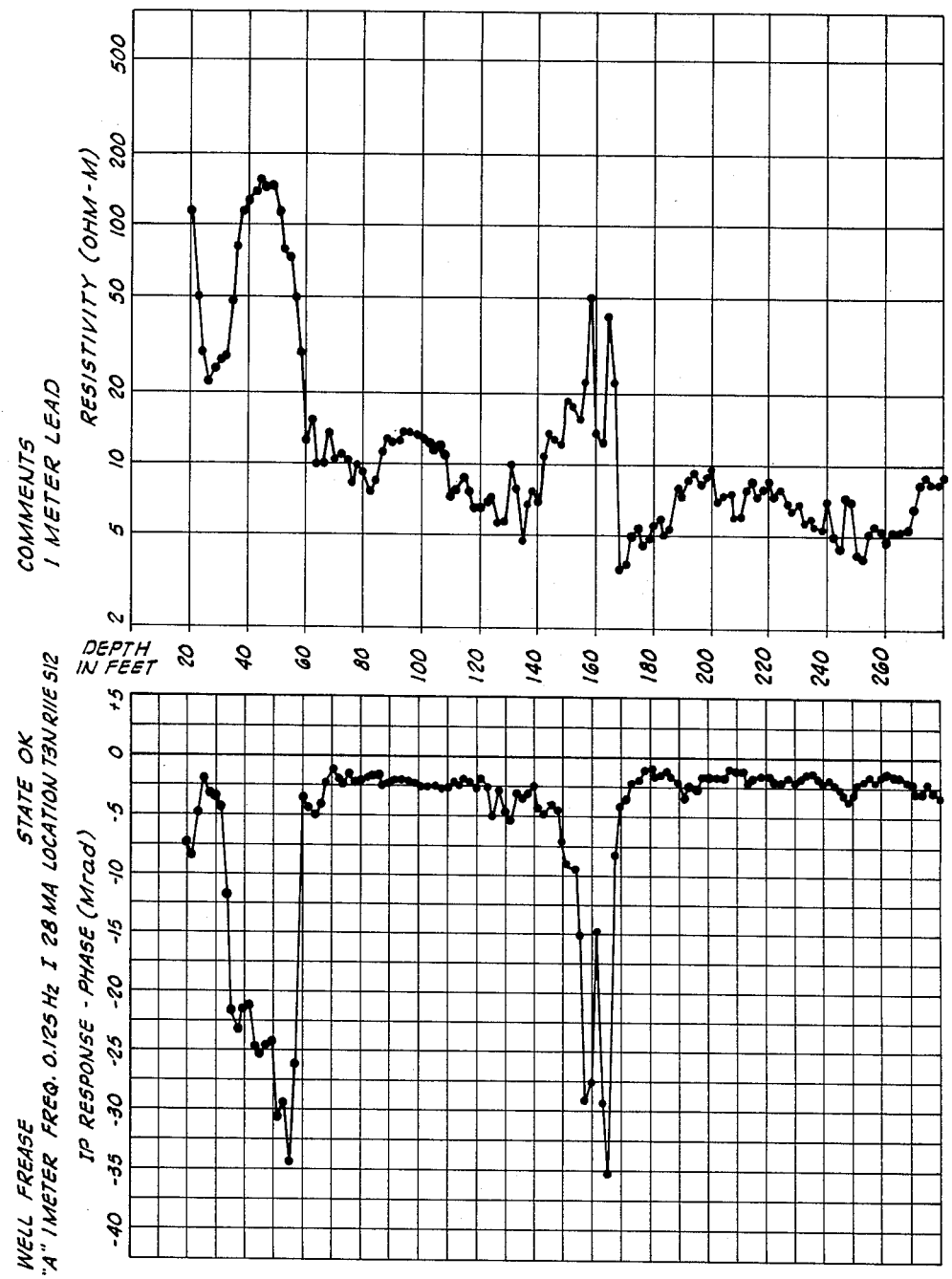
FIGS. 15 and 16 are exemplary plots of induced polarization and resistivity measurements produced by the present invention.
Figure 16:
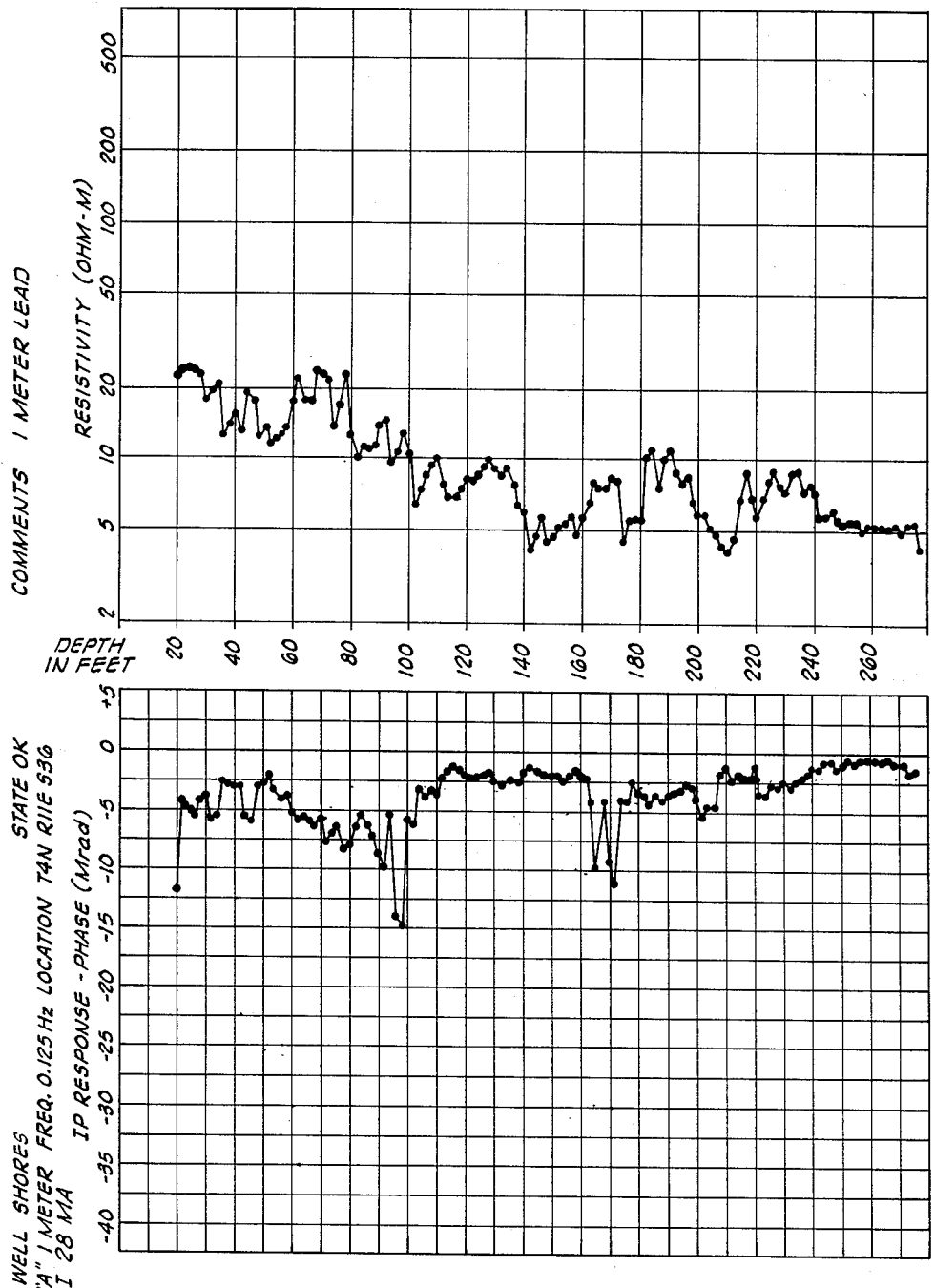

Through the use of the present invention, improved induced polarization and resistivity measurements can be made in a borehole. Examples of such measurements are illustrated in FIGS. 15 and 16. FIG. 15 is an induced polarization (IP) and resistivity log (using the one meter spacing tool described earlier) for a well in southeastern Oklahoma known as the Frease well. This well was drilled to test a near-surface IP anomaly overlying a deeper hydrocarbon reservoir as described in U.S. Pat. No. 4,295,046. FIG. 16 is the same type of log for a location away from the producing hydrocarbon field and without the near-surface IP anomaly. These logs are similar in kind to the downhole logs described in U.S. Pat. No. 4,295,096, but are greatly improved. As described in the present description, these later logs are not distorted by electrical leakage and have had the effects of EM coupling removed, and multiple electrode spacings were used in the well to determine the optimum array size to use in this particular case. The techniques described in the present disclosure represent a significantly improved capability for performing the evaluation of near-surface IP anomalies over hydrocarbon deposits described in U.S. Pat. No. 4,295,096.

Figure 17:
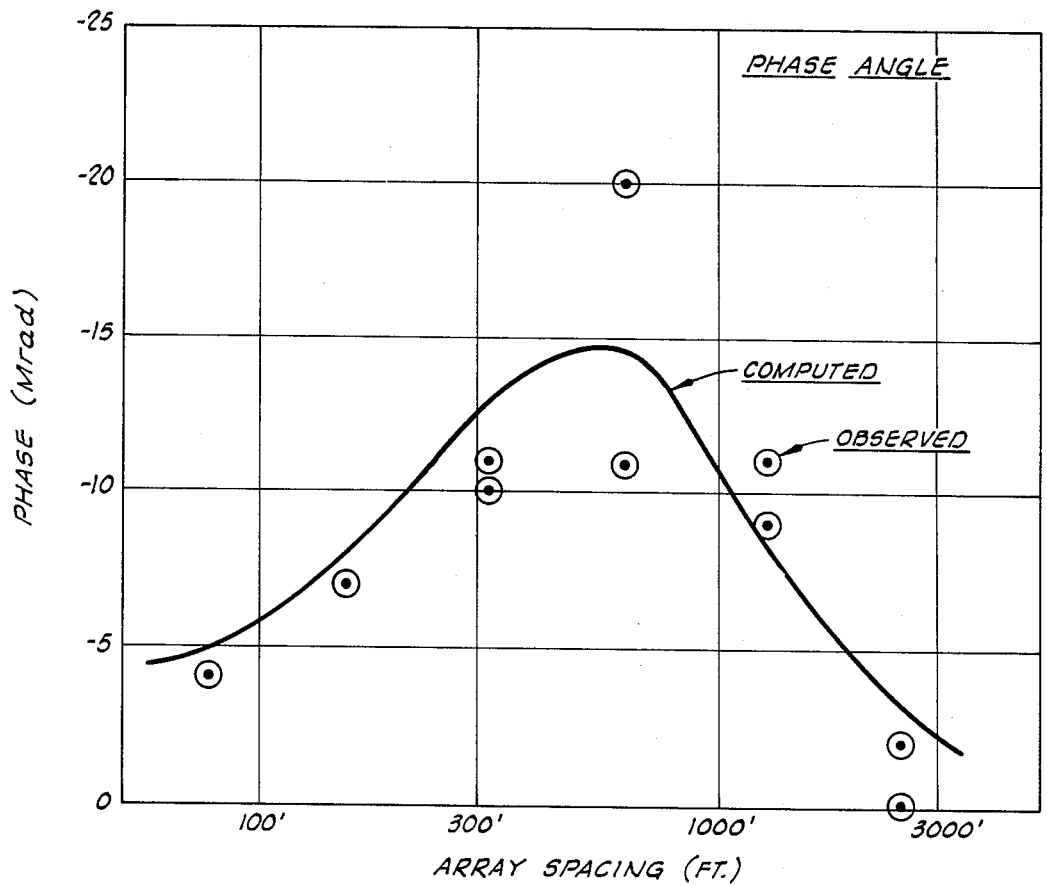
FIGS. 17 and 18 show the predicted surface phase angles and apparent resistivities, respectively, calculated by applying known potential field equations and boundary conditions and by using a model of the earth based on data shown in FIG. 15.
Figure 18:
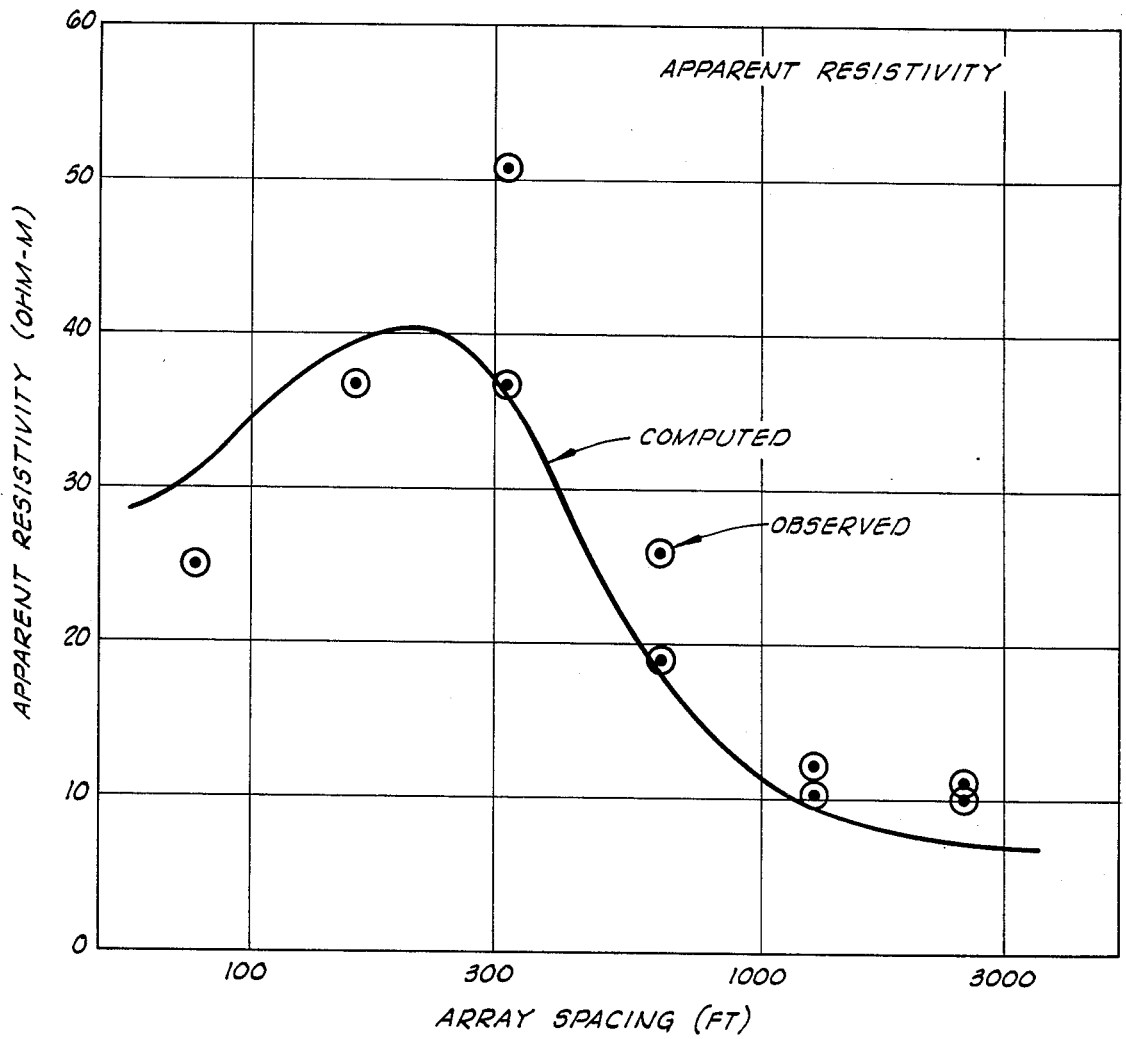

FIGS. 17 and 18 show the predicted surface phase angles and apparent resistivities, respectively, that were calculated using a straightforward application of the potential field equations and boundary conditions as are well known in the art (e.g., Keller, G. V. and Frischknect, F. C., *Electrical Methods in Geophysical Prospecting*, Pergomon Press, 1966) and using a model of the earth based on the Frease well log shown in FIG. 15. Also, superimposed on this plot are the surface readings that were measured at sites surrounding this well (as described in U.S. Pat. No. 4,295,096). The variability of the surface readings is large, but there is general agreement between the computed and the observed results. There is, of course, a range of models that will fit these data, but the general agreement between downhole and surface data provide a test of the logging tool described herein. The particular example described above was in a shallow well which had been drilled to evaluate a near-surface IP anomaly. This IP anomaly has been shown to be associated with hydrocarbon seepage (see U.S. Pat. No. 4,360,359).

This logging tool can be applied to many other problems where the complex resistivity (both magnitude and phase) must be determined downhole.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

Contact Resistance Program Listing
(For TI-59 Calculator)

| Statement Number | Key Number | Key Label | Comments |
|---|---|---|---|
| 000 | 76 | LBL | Initialize Program |
| 001 | 16 | A' | |
| 002 | 57 | ENG | |
| 003 | 70 | RAD | |
| 004 | 76 | LBL | Input Applied Voltage |
| 005 | 11 | A | |
| 006 | 54 | ) | |
| 007 | 42 | STO | |
| 008 | 10 | 10 | |
| 009 | 91 | R/S | |
| 010 | 53 | ( | |
| 011 | 76 | LBL | Input Current in ma for |
| 012 | 12 | B | electrodes 50 and 54 |
| 013 | 65 | X | |
| 014 | 93 | . | |
| 015 | 00 | 0 | |
| 016 | 00 | 0 | |
| 017 | 01 | 1 | |
| 018 | 54 | ) | |
| 019 | 42 | STO | |
| 020 | 11 | 11 | |
| 021 | 91 | R/S | |
| 022 | 53 | ( | |
| 023 | 76 | LBL | Input Current in ma for |
| 024 | 13 | C | electrodes 50 and 56 |
| 025 | 65 | X | |
| 026 | 93 | . | |
| 027 | 00 | 0 | |
| 028 | 00 | 0 | |
| 029 | 01 | 1 | |
| 030 | 54 | ) | |
| 031 | 42 | STO | |
| 032 | 12 | 12 | |
| 033 | 91 | R/S | |
| 034 | 53 | ( | |
| 035 | 76 | LBL | Input Current in ma for |
| 036 | 14 | D | electrodes 50 and 52 |
| 037 | 65 | X | |
| 038 | 93 | . | |
| 039 | 00 | 0 | |
| 040 | 00 | 0 | |
| 041 | 01 | 1 | |
| 042 | 54 | ) | |
| 043 | 42 | STO | |
| 044 | 13 | 13 | |
| 045 | 91 | R/S | |
| 046 | 53 | ( | |
| 047 | 76 | LBL | Input Current in ma for |
| 048 | 15 | E | electrodes 54 and 56 |
| 049 | 65 | X | |

-continued

Contact Resistance Program Listing
(For TI-59 Calculator)

| Statement Number | Key Number | Key Label | Comments |
|---|---|---|---|
| 050 | 93 | . | |
| 051 | 00 | 0 | |
| 052 | 00 | 0 | |
| 053 | 01 | 1 | |
| 054 | 54 | ) | |
| 055 | 42 | STO | |
| 056 | 14 | 14 | |
| 057 | 91 | R/S | |
| 058 | 76 | LBL | |
| 059 | 17 | B' | |
| 060 | 43 | RCL | |
| 061 | 10 | 10 | |
| 062 | 55 | — | |
| 063 | 43 | RCL | |
| 064 | 11 | 11 | |
| 065 | 95 | = | |
| 066 | 42 | STO | |
| 067 | 15 | 15 | |
| 068 | 43 | RCL | |
| 069 | 10 | 10 | |
| 070 | 55 | — | |
| 071 | 43 | RCL | |
| 072 | 12 | 12 | |
| 073 | 95 | = | |
| 074 | 42 | STO | |
| 075 | 16 | 16 | |
| 076 | 43 | RCL | |
| 077 | 10 | 10 | |
| 078 | 55 | — | |
| 079 | 43 | RCL | |
| 080 | 13 | 13 | |
| 081 | 95 | = | |
| 082 | 42 | STO | |
| 083 | 17 | 17 | |
| 084 | 43 | RCL | |
| 085 | 10 | 10 | |
| 086 | 55 | — | |
| 087 | 43 | RCL | |
| 088 | 14 | 14 | |
| 089 | 95 | = | |
| 090 | 42 | STO | |
| 091 | 18 | 18 | |
| 092 | 53 | ( | |
| 093 | 43 | RCL | |
| 094 | 15 | 15 | |
| 095 | 85 | + | |
| 096 | 43 | RCL | |
| 097 | 16 | 16 | |
| 098 | 75 | — | |
| 099 | 43 | RCL | |
| 100 | 18 | 18 | |
| 101 | 54 | ) | |
| 102 | 55 | — | |
| 103 | 02 | 2 | |
| 104 | 95 | = | |
| 105 | 42 | STO | Contact Resistance Plus Cable |
| 106 | 20 | 20 | Leg 1 |
| 107 | 43 | RCL | |
| 108 | 15 | 15 | |
| 109 | 75 | — | |
| 110 | 43 | RCL | |
| 111 | 20 | 20 | |
| 112 | 95 | = | |
| 113 | 42 | STO | Contact Resistance Plus Cable |
| 114 | 21 | 21 | Resistance Leg 2 |
| 115 | 43 | RCL | |
| 116 | 16 | 16 | |
| 117 | 75 | — | |
| 118 | 43 | RCL | |
| 119 | 20 | 20 | |
| 120 | 95 | = | |
| 121 | 42 | STO | Contact Resistance Plus Cable |
| 122 | 22 | 22 | Resistance Leg 3 |
| 123 | 43 | RCL | |
| 124 | 17 | 17 | |
| 125 | 75 | — | |

Contact Resistance Program Listing (For TI-59 Calculator) -continued

| Statement Number | Key Number | Key Label | Comments |
|---|---|---|---|
| 126 | 43 | RCL | |
| 127 | 20 | 20 | |
| 128 | 95 | = | |
| 129 | 42 | STO | Contact Resistance Plus Cable |
| 130 | 23 | 23 | Resistance Leg 4 |
| 131 | 43 | RCL | |
| 132 | 20 | 20 | |
| 133 | 75 | — | |
| 134 | 01 | 1 | ⎫ |
| 135 | 05 | 5 | ⎪ |
| 136 | 06 | 6 | ⎬ Cable Resistance Leg 1 (600' Cable = 15.81) |
| 137 | 93 | . | ⎪ |
| 138 | 00 | 0 | ⎭ |
| 139 | 95 | = | |
| 140 | 58 | FIX | |
| 141 | 01 | 01 | |
| 142 | 99 | PRT | |
| 143 | 91 | R/S | |
| 144 | 43 | RCL | |
| 145 | 21 | 21 | |
| 146 | 75 | — | |
| 147 | 01 | 1 | ⎫ |
| 148 | 05 | 5 | ⎪ |
| 149 | 09 | 9 | ⎬ Cable Resistance Leg 2 (600' Cable = 15.64) |
| 150 | 93 | . | ⎪ |
| 151 | 09 | 9 | ⎭ |
| 152 | 95 | = | |
| 153 | 99 | PRT | |
| 154 | 91 | R/S | |
| 155 | 43 | RCL | |
| 156 | 22 | 22 | |
| 157 | 75 | — | |
| 158 | 01 | 1 | ⎫ |
| 159 | 06 | 6 | ⎪ |
| 160 | 04 | 4 | ⎬ Cable Resistance Leg 3 (600' Cable = 15.99) |
| 161 | 93 | . | ⎪ |
| 162 | 08 | 8 | ⎭ |
| 163 | 95 | = | |
| 164 | 99 | PRT | |
| 165 | 91 | R/S | |
| 166 | 43 | RCL | |
| 167 | 23 | 23 | |
| 168 | 75 | — | |
| 169 | 01 | 1 | ⎫ |
| 170 | 06 | 6 | ⎪ |
| 171 | 05 | 5 | ⎬ Cable Resistance Leg 4 (600' Cable = 15.43) |
| 172 | 93 | . | ⎪ |
| 173 | 00 | 0 | ⎭ |
| 174 | 95 | = | |
| 175 | 99 | PRT | |
| 176 | 91 | R/S | |
| 177 | 00 | 0 | |
| 178 | 42 | STO | |
| 179 | 15 | 15 | |
| 180 | 00 | 0 | |
| 181 | 42 | STO | |
| 182 | 16 | 16 | |
| 183 | 00 | 0 | |
| 184 | 42 | STO | |
| 185 | 17 | 17 | |
| 186 | 00 | 0 | |
| 187 | 42 | STO | |
| 188 | 18 | 18 | |
| 189 | 00 | 0 | |
| 190 | 42 | STO | |
| 191 | 20 | 20 | |
| 192 | 00 | 0 | |
| 193 | 42 | STO | |
| 194 | 21 | 21 | |
| 195 | 00 | 0 | |
| 196 | 42 | STO | |
| 197 | 22 | 22 | |
| 198 | 00 | 0 | |
| 199 | 42 | STO | |
| 200 | 23 | 23 | |
| 201 | 43 | RCL | |
| 202 | 10 | 10 | |
| 203 | 99 | PRT | |
| 204 | 43 | RCL | |
| 205 | 11 | 11 | |
| 206 | 99 | PRT | |
| 207 | 43 | RCL | |
| 208 | 12 | 12 | |
| 209 | 99 | PRT | |
| 210 | 43 | RCL | |
| 211 | 13 | 13 | |
| 212 | 99 | PRT | |
| 213 | 43 | RCL | |
| 214 | 14 | 14 | |
| 215 | 99 | PRT | |
| 216 | 22 | INV | |
| 217 | 58 | FIX | |
| 218 | 98 | ADV | |
| 219 | 98 | ADV | |
| 220 | 91 | R/S | |

The embodiments of the invention in which an exclusive property or privilege is claimed are defined as follows:

1. A method of determining the induced polarization response of a formation in which a borehole is disposed, comprising:

lowering a logging tool into said borehole, said logging tool having a first set of two electrodes and a second set of two electrodes;

conducting a first current between said electrodes of said first set of electrodes and through said formation;

detecting with said second set of electrodes a first voltage produced in said formation by said first current;

determining a first phase response from said detected first voltage;

determining the resistivity of the formation from said conducted first current and said detected first voltage;

determining the contact resistances individually of each of the electrodes of said first set of two electrodes and said second set of two electrodes;

replacing said first set of two electrodes and said second set of two electrodes with a dummy load simulating the resistivity of the formation and the contact resistances of each of the electrodes;

conducting a second current through said dummy load;

detecting a second voltage produced in said dummy load by said second current;

determining a second phase response from said second detected voltage, said second phase response indicating the electromagnetic coupling; and subtracting said second phase response from said first phase response to obtain a corrected induced polarization response of the formation.

2. A method as defined in claim 1 wherein the step of determining the contact resistances includes the steps of:

connecting voltage source means to a first one and a second one of said electrodes to cause a third current to flow therebetween;

measuring the magnitude of said third current; connecting said voltage source means to said first one and a third one of said electrodes to cause a fourth current to flow therebetween;

measuring the magnitude of said fourth current;

connecting said voltage source means to said first one and a fourth one of said electrodes to cause a fifth current to flow therebetween;

measuring the magnitude of said fifth current;

connecting said voltage source means to said second one and said third one of said electrodes to thereby cause a sixth current to flow therebetween;

measuring the magnitude of said sixth current; and inputting the magnitude of said predetermined voltage and the measured magnitude of said third, fourth, fifth and sixth currents into computer means for computing the contact resistances of said four electrodes.

3. A method as defined in claim 2, further comprising testing said logging tool for electrical leakage, including:

disconnecting from said dummy load the contact resistance simulating means which replaced said second set of electrodes;

electrically short-circuiting said disconnected contact resistance simulating means and monitoring the current signal through the contact resistance simulating means which replaced said first set of electrodes;

reconnecting to said dummy load the contact resistance simulating means which replaced said second set of electrodes; and disconnecting from said dummy load said contact resistance simulating means which replaced said first set of electrodes and monitoring the potential signal in said reconnected contact resistance simulating means.

* * * * *